(12) United States Patent
Sano et al.

(10) Patent No.: US 9,141,523 B2
(45) Date of Patent: Sep. 22, 2015

(54) CONTROL APPARATUS, CONTROL SYSTEM, AND COMMUNICATION METHOD FOR CONTROLLING ONE OR MORE MOTORS IN SERIAL COMMUNICATION WITH A CONTROLLER

(75) Inventors: Shuya Sano, Chiyoda-ku (JP); Daisuke Koyama, Chiyoda-ku (JP); Hiroki Imai, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 191 days.

(21) Appl. No.: 13/980,109

(22) PCT Filed: Feb. 25, 2011

(86) PCT No.: PCT/JP2011/054394
§ 371 (c)(1),
(2), (4) Date: Jul. 17, 2013

(87) PCT Pub. No.: WO2012/114525
PCT Pub. Date: Aug. 30, 2012

(65) Prior Publication Data
US 2013/0297897 A1    Nov. 7, 2013

(51) Int. Cl.
*G06F 12/02* (2006.01)
*H04L 29/08* (2006.01)
(Continued)

(52) U.S. Cl.
CPC ............... *G06F 12/00* (2013.01); *G06F 12/02* (2013.01); *G06F 12/0292* (2013.01); *H04L 67/12* (2013.01); *G05B 19/44* (2013.01); *G06F 2213/0038* (2013.01); *H04L 1/0061* (2013.01)

(58) Field of Classification Search
CPC ..... G06F 12/00; G06F 12/02; G06F 2212/40; G06F 2212/403; G06F 13/00; G06F 13/38; G06F 13/1668; G06F 13/1673; G06F 2213/038; G06F 12/0292; H04L 1/0061; H04L 67/12; H04L 29/08; H04L 13/08; G05B 19/414

See application file for complete search history.

(56) References Cited

U.S. PATENT DOCUMENTS 5,412,659 A * 5/1995 Fujita et al. .................. 714/776
5,436,892 A   7/1995 Tago et al.
(Continued)

FOREIGN PATENT DOCUMENTS

JP   61-029242 A    2/1986
JP   62-274851 A    11/1987
(Continued)

OTHER PUBLICATIONS

Communication dated Oct. 27, 2014, issued by the Taiwanese Patent Office in counterpart Application No. 100129920.

*Primary Examiner* — Michael Krofcheck
(74) *Attorney, Agent, or Firm* — Sughrue Mion, PLLC; Richard C. Turner

(57) ABSTRACT

In a control apparatus for performing serial data communication, a transmitting section includes a memory to store data for other control apparatuses and a transmission control section to generate a frame containing the data and memory storage information indicating a storage position of the data in buffer memories of the receiving sections of the other control apparatuses. A receiving section includes a reception control section to extract the memory storage information and the data from the frame, a buffer memory to store the extracted data, and a data-storage processing section to store the extracted data in an address of the buffer memory designated by the memory storage information. The memory storage information is set for each of the control apparatuses. A control section reads out the data from an address of the buffer memory for each of the other control apparatuses.

9 Claims, 16 Drawing Sheets

(51) Int. Cl.
*H04L 1/00* (2006.01)
*G06F 12/00* (2006.01)
*G05B 19/44* (2006.01)

(56) References Cited

U.S. PATENT DOCUMENTS

| | | | |
|---|---|---|---|
| 6,393,544 B1 * | 5/2002 | Bryg et al. | 711/220 |
| 6,792,330 B1 | 9/2004 | Matsumoto et al. | |
| 2003/0097540 A1 * | 5/2003 | Takase et al. | 711/220 |
| 2003/0223374 A1 * | 12/2003 | Hayashi | 370/242 |
| 2008/0104162 A1 | 5/2008 | Suzuki | |

FOREIGN PATENT DOCUMENTS

| | | |
|---|---|---|
| JP | 63-293657 A | 11/1988 |
| JP | 6-090256 A | 3/1994 |
| JP | 9-114729 A | 5/1997 |
| JP | 9-269934 A | 10/1997 |
| JP | 11-032100 A | 2/1999 |
| JP | 2000-148442 A | 5/2000 |
| JP | 2003-271209 A | 9/2003 |
| JP | 2004-165764 A | 6/2004 |
| JP | 2008-109473 A | 5/2008 |
| WO | 01/02918 A1 | 1/2001 |

* cited by examiner

FIG.17

| RECEPTION STORAGE INFORMATION | STORAGE ADDRESS INFORMATION |
|---|---|
| 0100h | A100h |
| 0200h | A200h |
| 0300h | A300h |
| ⋮ | ⋮ |
| 0700h | A100h |
| 0800h | A200h |
| ⋮ | ⋮ |

BUFFER MEMORY ADDRESS

BUFFER MEMORY — 45

| | |
|---|---|
| 0000h | |
| A100h | FRAME 111 RECEIVED DATA STATE |
| | FRAME 111 RECEIVED DATA |
| A200h | FRAME 112 RECEIVED DATA STATE |
| | FRAME 112 RECEIVED DATA |
| A300h | FRAME 113 RECEIVED DATA STATE |
| | FRAME 113 RECEIVED DATA |
| | |

FIG.20

TABLE 461A / 64

| RECEPTION STORAGE INFORMATION | COMPARISON RANGE INFORMATION | ADDRESS CALCULATION INFORMATION |
|---|---|---|
| 0100h | FF00h | A100h |
| ⋮ | | ⋮ |

FIG.21

BUFFER MEMORY 45

| BUFFER MEMORY ADDRESS | BUFFER MEMORY |
|---|---|
| 0000h | |
| A100h | FRAME 111 RECEIVED DATA STATE |
| | FRAME 111 RECEIVED DATA |
| A120h | FRAME 112 RECEIVED DATA STATE |
| | FRAME 112 RECEIVED DATA |
| A160h | FRAME 113 RECEIVED DATA STATE |
| | FRAME 113 RECEIVED DATA |
| | |

CONTROL APPARATUS, CONTROL SYSTEM, AND COMMUNICATION METHOD FOR CONTROLLING ONE OR MORE MOTORS IN SERIAL COMMUNICATION WITH A CONTROLLER

CROSS REFERENCE TO RELATED APPLICATIONS

This application is a National Stage of International Application No. PCT/JP2011/054394 filed Feb. 25, 2011, the contents of all of which are incorporated herein by reference in their entirety.

FIELD

The present invention relates to a control apparatus, a control system, and a communication method.

BACKGROUND

In a control apparatus including a controller that controls the entire apparatus and a plurality of motors, in general, the controller and the motors are connected by serial communication. Because the devices are connected by the serial communication, it is possible to realize wire-saving and improvement of maintainability of the entire apparatus.

In general, the motors include motors and motor driving devices. The serial communication is performed between the controller and the motor driving devices. By the serial communication, moving commands for positions, speeds, torques, and the like are transmitted from the controller to the motor driving devices, and control state amounts such as positions, speeds, and driving current values of the motors are transmitted from the motor driving devices.

In such serial communication for driving control for the purpose of motor control, the controller and the motor driving devices transmit the moving commands and the control state amounts to each other at a fixed interval to stably perform the operation of the motors. The controller performs serial communication control with the fixed interval set as a communication period. The controller sequentially updates the moving commands and transmits the moving commands to the motor driving devices at the fixed communication period. The controller performs the motor control such that the motor driving devices perform reception processing at every communication period and follow commands extracted from received data. Consequently, the controller can control the motors with desired positions, speeds, torques, and the like.

According to necessity, the controller applies, at every communication period, reception processing to the control state amounts sequentially updated and transmitted from the motor driving devices at the fixed communication period, applies necessary control processing to the motor driving devices, based on necessary control state amounts extracted from received data, reflects a result of the control processing on next motor control commands, and controls the entire motor driving devices.

In the serial communication for driving control, because the commands and the state amounts are sequentially updated as explained above, a reception control section in the serial communication updates received data at every communication period. In some case, an FIFO (First In, First Out) buffer is used for a buffer memory, which stores the received data, to retain a plurality of received data at one communication period or retain a plurality of received data at a plurality of communication periods.

When the reception control section retains a plurality of received data at a plurality of communication period, in the serial communication for driving control, once communication between apparatuses is started, a specified communication frame is periodically transmitted at a specified communication period. Therefore, the reception control section periodically stores received data of communication frames in the buffer memory for reception according to a management table for managing a storage position of the received data (see, for example, Patent Literature 1).

As in the normal serial communication, in the serial communication for driving control, when the communication frame is transmitted, the communication frame is accompanied by check data for detecting data corruption on a communication path. A reception side checks reliability of received data from the received data and the check data and retains a result of the check as a received data state. When a plurality of packets of received data is retained, it is necessary to retain received data states by the amount of the retained received data (see, for example, Patent Literature 2).

The communication frame of the serial communication is transmitted with specific bit patterns added to the start and the end of data to be transmitted. The specific bit pattern at the start is referred to as start flag. The bit pattern at the end is referred to as end flag. A receiving section identifies the start flag to start reception processing for the communication frame. The receiving section recognizes, with the end flag, the end of the communication frame to receive one communication frame.

CITATION LIST

Patent Literature

Patent Literature 1: Japanese Patent Application Laid-open No. 11-32100
Patent Literature 2: Japanese Patent Application Laid-open No. 63-293657

SUMMARY

Technical Problem

In the conventional serial communication for driving control in the past explained above, in general, the received data is stored in the buffer memory in order. However, when a plurality of packets of received data is retained, a received-data processing section is necessary that performs processing for determining where in the buffer memory the received data should be stored and which received data should be extracted from where in the buffer memory.

When the received data and the received data states are separately retained and, in particular, a plurality of packets of received data is retained, it is necessary to clarify combinations of the received data and the received data states. In the case of normal reception without a deficiency of a communication frame, it is relatively easy to determine a combination of the received data and the received data states. However, when a communication frame is deficient, there is a problem in that time is required for processing for specifying the deficient communication frame and combining the received data and the received data states.

The present invention has been made in view of the above. It is an object of the present invention to obtain a control apparatus, a control system, and a communication method that can easily extract, in serial communication for driving control, received data from a buffer memory in which a plurality of packets of received data is stored.

Solution to Problem

The present invention is directed to a control apparatus that achieves the object.

One aspect of the present invention relates to a control apparatus used in a control system in which at least two control apparatuses, each including a control section, a transmitting section, and a receiving section, are connected via a network and one of the control apparatuses generates a reference timing. The control system performs data communication by serial communication among the control apparatuses under a predetermined communication period.

The transmitting section includes a memory configured to store data to be transmitted to the other control apparatuses, and a transmission control section configured to generate a frame containing the data acquired from the memory and memory storage information indicating storage positions of the data in buffer memories of the receiving sections of the other control apparatuses.

The receiving section includes a reception control section configured to extract the memory storage information and the data from the frame, a buffer memory configured to store the extracted data, and a data-storage processing section configured to store the extracted data in an address of the buffer memory designated by the memory storage information.

The memory storage information is set for each of the control apparatuses set as a destination of the frame, and each control section reads out, every time, the data from the address of the buffer memory fixedly set for each of the other control apparatuses.

Advantageous Effects of Invention

According to the present invention, received data is stored in a specific address of the buffer memory in accordance with memory storage information in a frame. Therefore, the receiving section side does not need to retain information for managing a storage position of the received data in the buffer memory. It is possible to reduce processing time during reception. Because processing time necessary for reception processing is reduced, the invention has advantages in that it reduces a data update period between the control apparatuses and it improves the performance of the entire network to which the control apparatuses are connected.

BRIEF DESCRIPTION OF DRAWINGS

FIG. 17 is a schematic diagram of an example of the configuration of a table.

FIG. 18 is a schematic diagram of an example of a state of a buffer memory of a controller according to the third embodiment.

FIG. 20 is a schematic diagram of an example of the configuration of a table.

FIG. 21 is a schematic diagram of an example of a state of a buffer memory of a controller according to the fourth embodiment.

DESCRIPTION OF EMBODIMENTS

Preferred embodiments of a control apparatus, a control system, and a communication method according to embodiments of the present invention are explained in detail below with reference to the accompanying drawings. The present invention is not limited by the embodiments.

First Embodiment

Figure 1:
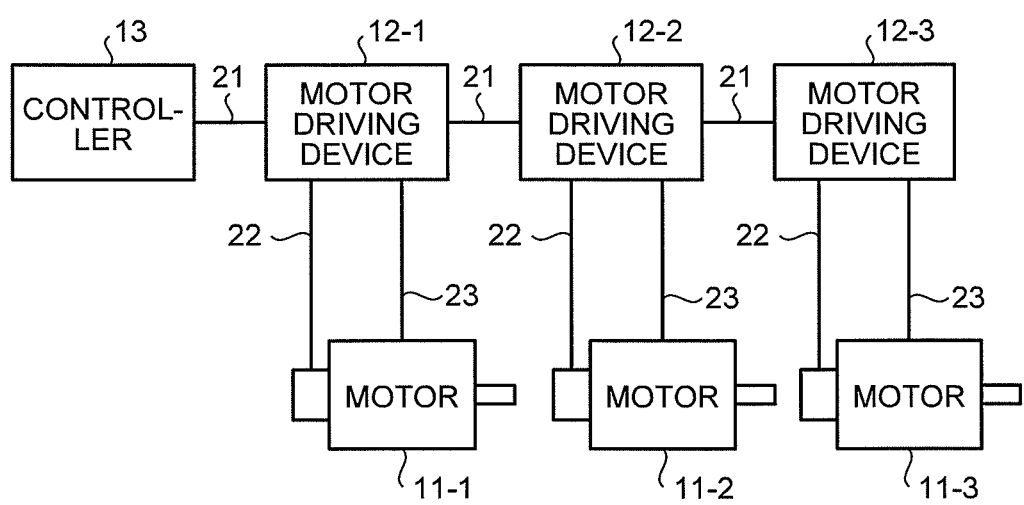
FIG. 1 is a schematic diagram of an example of a motor driving control system configured via a network in serial communication according to a first embodiment of the present invention.

FIG. 1 is a schematic diagram of an example of a motor driving control system configured via a network by serial communication according to a first embodiment of the present invention. The motor driving control system includes a plurality of motors 11-1 to 11-3 such as servomotors or induction motors to be controlled, motor driving devices 12-1 to 12-3 configured to control the respective motors 11-1 to 11-3, and a controller 13 configured to control the operation of the entire motor driving devices 12-1 to 12-3. The controller 13 and the motor driving devices 12-1 to 12-3 are connected by a serial communication line 21 to perform data communication.

The motor driving devices 12-1 to 12-3 and the motors 11-1 to 11-3 are connected by power lines 22 and detector cables 23, respectively. The motor driving devices 12-1 to 12-3 transmit motor driving power to the motors 11-1 to 11-3 via the power lines 22. The motors 11-1 to 11-3 transmit motor angle information acquired by detectors (not shown), which detect rotation angles of the motors 11-1 to 11-3, to the motor driving devices 12-1 to 12-3 via the detector cables 23. The motor driving devices 12-1 to 12-3 control motor angles according to a command from the controller 13, based on the motor driving power and the motor angle information. In the example explained in the first embodiment, the motor angle information is used in motor driving control. However, the motor angle information is not always necessary in the motor driving control. The motor driving control can be performed using other information without using the motor angle information.

The controller 13 and each of the motor driving devices 12-1 to 12-3 include control sections, transmitting sections, and receiving sections and perform data communication through the serial communication line 21. The controller 13 transmits moving commands for positions, speeds, torques, and the like and other control signals to the motor driving devices 12-1 to 12-3. The control sections of the motor driving devices 12-1 to 12-3 control the motors 11-1 to 11-3 with designated positions, speeds, and torques according to the moving commands from the controller 13, whereby the controller 13 can control the entire motor driving devices 12-1 to 12-3. The motor driving devices 12-1 to 12-3 transmit positions, speeds, driving currents, various control signals, and abnormal states of the motors 11-1 to 11-3 to the controller 13. The control section of the controller 13 feeds back a control state according to necessity and controls the next command. When determining that motor control is abnormal, the control section issues a stop command to the motor driving devices 12-1 to 12-3. The controller 13 configures a control apparatus or an overall control apparatus. The motor driving devices 12-1 to 12-3 configure a control apparatus.

Figure 2:
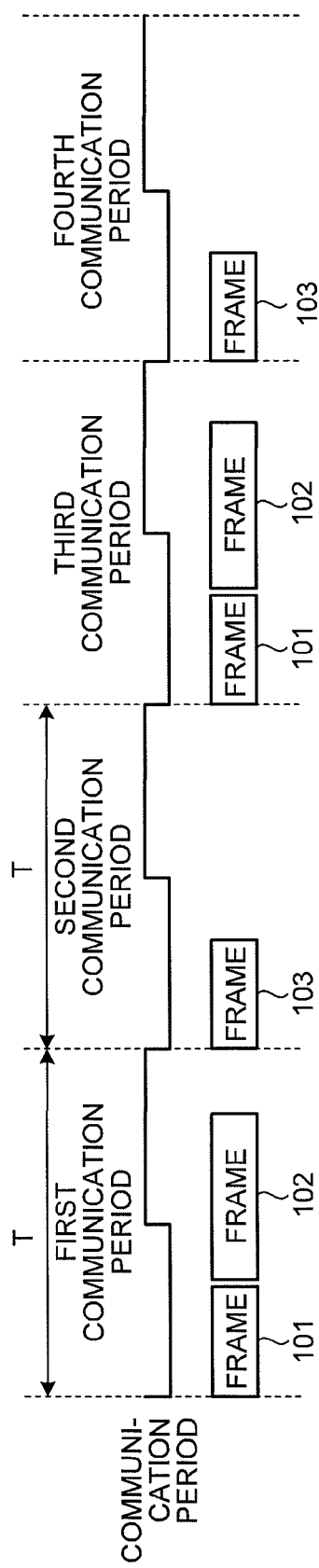
FIG. 2 is a diagram of an example of transmission timings for data transmitted from a controller to motor driving devices.

The controller 13 and the motor driving devices 12-1 to 12-3 perform communication at a predetermined interval to stably perform the operation of the motors 11-1 to 11-3. More specifically, the controller 13 and one of the motor driving devices 12-1 to 12-3 generate a reference of timing or reference timing and perform communication under a specified communication period. FIG. 2 is a diagram of an example of transmission timings of data transmitted from the controller to the motor driving devices. Communication at a fixed interval is specified by a communication period T. Data transmitted from the controller 13 to the motor driving device 12-1 is a frame 101. Data transmitted from the controller 13 to the motor driving devices 12-2 and 12-3 are frames 102 and 103, respectively.

As shown in the figure, at a first communication period, the controller 13 transmits the frame 101 including command data for the motor driving device 12-1 and the frame 102 including command data for the motor driving device 12-2. At the next second communication period, the controller 13 transmits the frame 103 including command data for the motor driving device 12-3. At a third communication period, the controller 13 transmits the frame 101 including the next command data for the motor driving device 12-1 and the frame 102 including the next command data for the motor driving device 12-2. At a fourth communication period, the controller 13 transmits the frame 103 including the next command data for the motor driving device 12-3. The command data updated at the fixed interval in this way is transmitted from the controller 13 to the motor driving devices 12-1 to 12-3, whereby the controller 13 can perform motor control.

Figure 3:
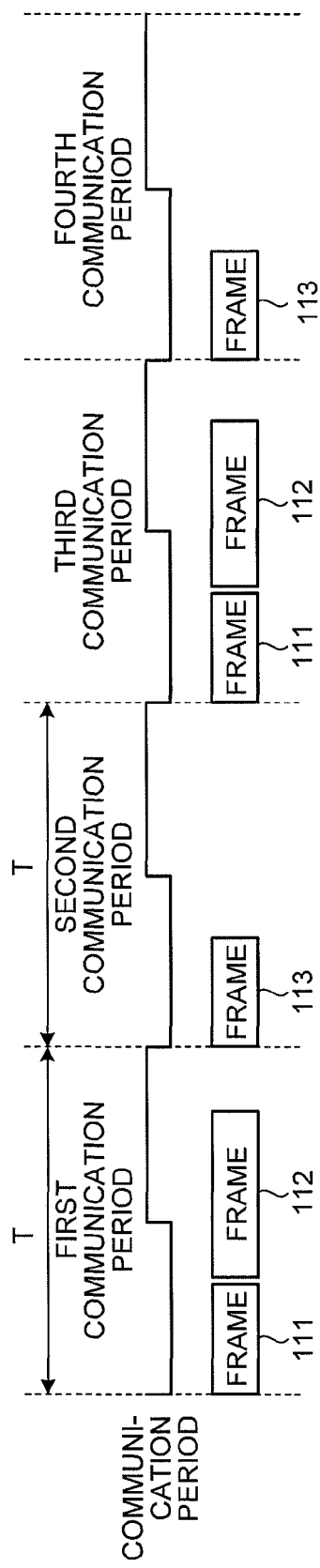
FIG. 3 is a diagram of an example of transmission timings of data transmitted from the motor driving devices to the controller.

FIG. 3 is a diagram of an example of transmission timings of data transmitted from the motor driving devices to the controller. In this example, as explained above, communication at a fixed interval is specified by the communication period T. The communication period T can be the same as or different from the communication period T for the data transmission from the controller 13 to the motor driving devices 12-1 to 12-3 shown in FIG. 2. Data transmitted from the motor driving device 12-1 to the controller 13 is a frame 111, and data transmitted from the motor driving devices 12-1 and 12-3 to the controller 13 are frames 112 and 113, respectively.

As shown in FIG. 3, at the first communication period, the motor driving device 12-1 transmits the frame 111 including state data, and the motor driving device 12-2 transmits the frame 112 including state data. At the next second communication period, the motor driving device 12-3 transmits the frame 113 including state data. At the third communication period, the motor driving devices 12-1 and 12-2 transmit the frames 111 and 112 including state data, respectively. At the fourth communication period, the motor driving device 12-3 transmits the frame 113 including the next state information. In this way, like the command data, various states of the motor driving devices 12-1 to 12-3 updated at the fixed interval are transmitted to the controller 13. Consequently, the controller 13 can apply control corresponding to the states of the motor driving devices 12-1 to 12-3 to the entire system or can sequentially grasp the states of the motor driving devices 12-1 to 12-3 and take measures for stopping the motors 11-1 to 11-3 if the entire system is in a dangerous state.

When the data transmission shown in FIGS. 2 and 3 is performed between the controller 13 and the motor driving devices 12-1 to 12-3, the data transmission is realized by connecting at least two serial communication lines 21 between the units (the controller 13 and the motor driving devices 12-1 to 12-3).

Figure 4:
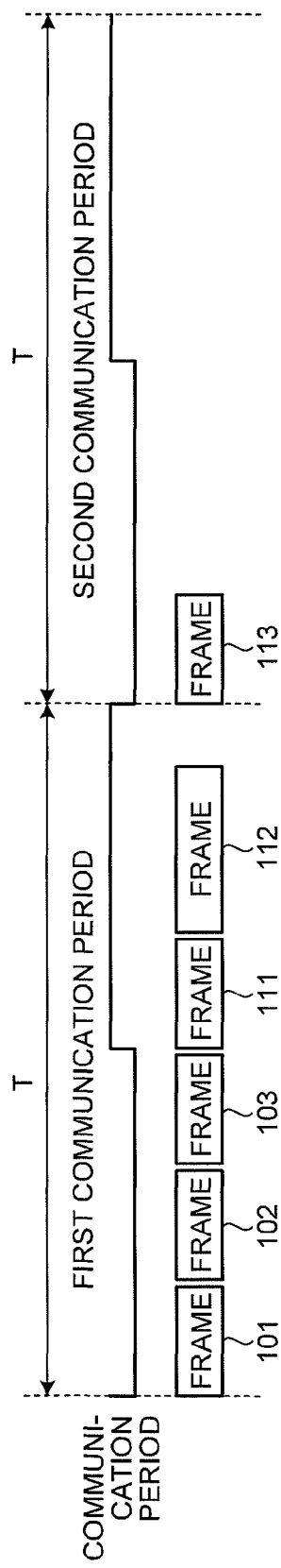
FIG. 4 is a diagram of an example of transmission timings of data transmitted between the controller and the motor driving devices.

FIG. 4 is a diagram of an example of transmission timings of data transmitted between the controller and the motor driving devices. In this example, a fixed interval is specified by the communication period T. This is an example of respective transmission timings of data transmitted from the controller 13 to the motor driving devices 12-1 to 12-3 and data transmitted from the motor driving devices 12-1 to 12-3 to the controller 13. The frames same as the frames shown in FIGS. 2 and 3 are denoted by the same number.

As shown in FIG. 4, at the first communication period, the controller 13 transmits the frames 101 to 103 including command data to the motor driving devices 12-1 to 12-3, respectively. The motor driving devices 12-1 and 12-2 transmit the frames 111 and 112 including state data to the controller 13, respectively. At the second communication period, the motor driving device 12-3 transmits the frame 113 including state data to the controller 13. In this example, at the first and second communication periods, transmission and reception of one set of command data and state data is performed. At the next third and fourth communication periods, transmission and reception of one set of updated command data and state data is performed. That is, as in the example shown in FIGS. 2 and 3, the command data and the state data are updated at the fixed interval.

When the data transmission shown in FIG. 4 is performed between the controller 13 and the motor driving devices 12-1 to 12-3, the data transmission can be realized by connecting at least one serial communication line 21 between the units. In FIGS. 2 to 4, the communication of the entire motor driving control system is performed at the two communication periods. However, the communication of the entire motor driving control system can be performed at one communication period or three or more communication periods.

The units constituting such motor driving control system include a transmitting section configured to transmit data to the other units and a receiving section configured to receive data from the other units.

Figure 5:
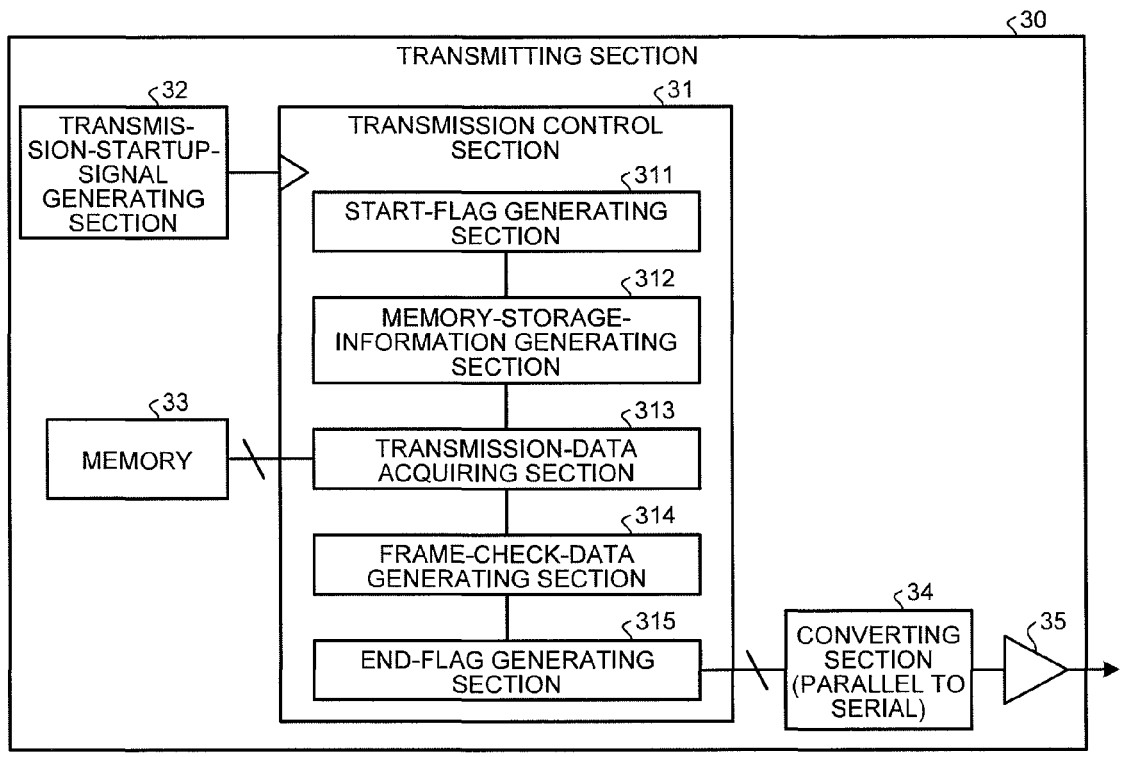
FIG. 5 is a schematic block diagram of a functional configuration of a transmitting section provided in a unit according to the first embodiment.

FIG. 5 is a schematic block diagram of a functional configuration of the transmitting section provided in the unit according to the first embodiment. A transmitting section 30 includes a transmission control section 31, a transmission-startup-signal generating section 32, a memory 33, a converting section 34, and a transmission buffer 35.

Figure 6:
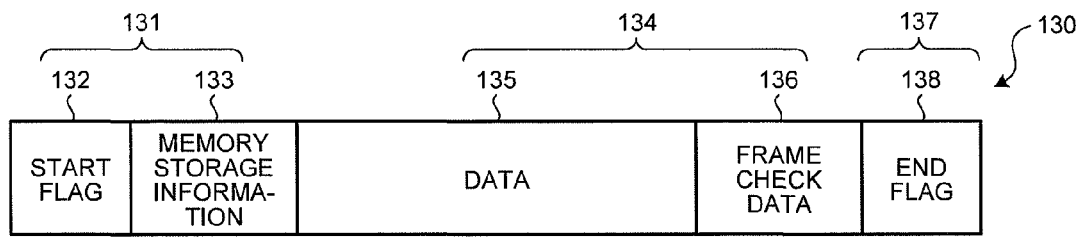
FIG. 6 is a diagram of an example of the configuration of a frame used in the embodiment.

The transmission control section 31 starts operation according to a startup signal from the transmission-startup-signal generating section 32, generates transmission data as a frame specified by a communication protocol, and performs control of entire transmission. FIG. 6 is a diagram of an example of the configuration of a frame used in the embodiment. As shown in the figure, besides data that should be transmitted, a frame 130 has a data structure that incorporates various flags necessary when the receiving section analyzes serial data. The frame 130 includes a frame header section 131, a frame data section 134, and a frame footer section 137. The frame header section 131 includes a start flag 132 for identifying the start of the frame 130 and memory storage information 133 in which information peculiar to a communication frame is stored. The frame data section 134 includes data 135 in which data transmitted by the units are stored and frame check data 136 such as CRC (Cyclic Redundancy Check) information or checksum information for determining whether the received frame 130 is normal data. The frame check data 136 can set as a check target, for example, the start flag 132 of the frame header section 131 to the data 135 of the frame data section 134. However, the check target is not limited to this. The frame footer section 137 includes an end flag 138 for identifying the end of the frame.

In the first embodiment, an address in a buffer memory of a reception-side control apparatus, in which the data 135 of the frame data section 134 is stored, is defined in the memory storage information 133. For example, the address for the storage in the buffer memory of the reception-side control apparatus is determined for each type of the frames 101 to 103 and 111 to 113 transmitted at the fixed period shown in FIGS. 2 to 4. The address in the buffer memory of the reception-side control apparatus is stored in the memory storage information 133 according to a destination.

The transmission control section 31 includes a start-flag generating section 311, a memory-storage-information generating section 312, a transmission-data acquiring section 313, a frame-check-data generating section 314, and an end-flag generating section 315. The frame 130, as shown in FIG. 6, includes the start flag 132, the memory storage information 133, the data 135, the frame check data 136, and the end flag 138, from the start in this order. The start flag 132, the memory storage information 133, the data 135, the frame check data 136, and the end flag 138 are generated by the start-flag generating section 311, the memory-storage-information generating section 312, the transmission-data acquiring section 313, the frame-check-data generating section 314, and the end-flag generating section 315, respectively.

The start-flag generating section 311 generates as the start flag 132 a specific bit pattern peculiar to a communication protocol.

The memory-storage-information generating section 312 generates, for each frame, as the memory storage information 133, information concerning in which address of a buffer memory of a destination unit the frame 130 received by a receiving section of the unit should be stored. In generating the information, the memory-storage-information generating section 312 refers to association information (not shown) that associates a frame with an address in a reception destination buffer. In the association information, for example, a unit set as a destination and an address in a buffer memory of a reception side unit in which the data 135 is stored are associated.

The transmission-data acquiring section 313 reads out, from the memory 33, data that should be transmitted and sets the data as the data 135. The frame-check-data generating section 314 calculates CRC information or checksum information of frame data and adds the CRC information or the checksum information as the frame check data 136. The end-flag generating section 315, like the start flag 132, generates as the end flag 138 a specific bit pattern peculiar to the communication protocol.

In this way, the information generated by each processing section of the transmission control section 31 is added in order, and the frame 130 shown in FIG. 6 is generated.

The transmission-startup-signal generating section 32 generates a transmission startup signal for the transmission control section 31, according to specified transmission timing, to output transmission data at a fixed period. Consequently, transmission data updated at a fixed interval at the fixed communication period shown in FIGS. 2 to 4 is transmitted.

The memory 33 stores data transmitted to the other units constituting the motor driving control system. The data stored in the memory 33 is periodically rewritten by a CPU or the like. Sequential update of transmission data is realized.

The converting section 34 converts parallel data output by the transmission control section 31 as transmission data into serial data. The transmission buffer 35 transmits the serial data.

Figure 7:
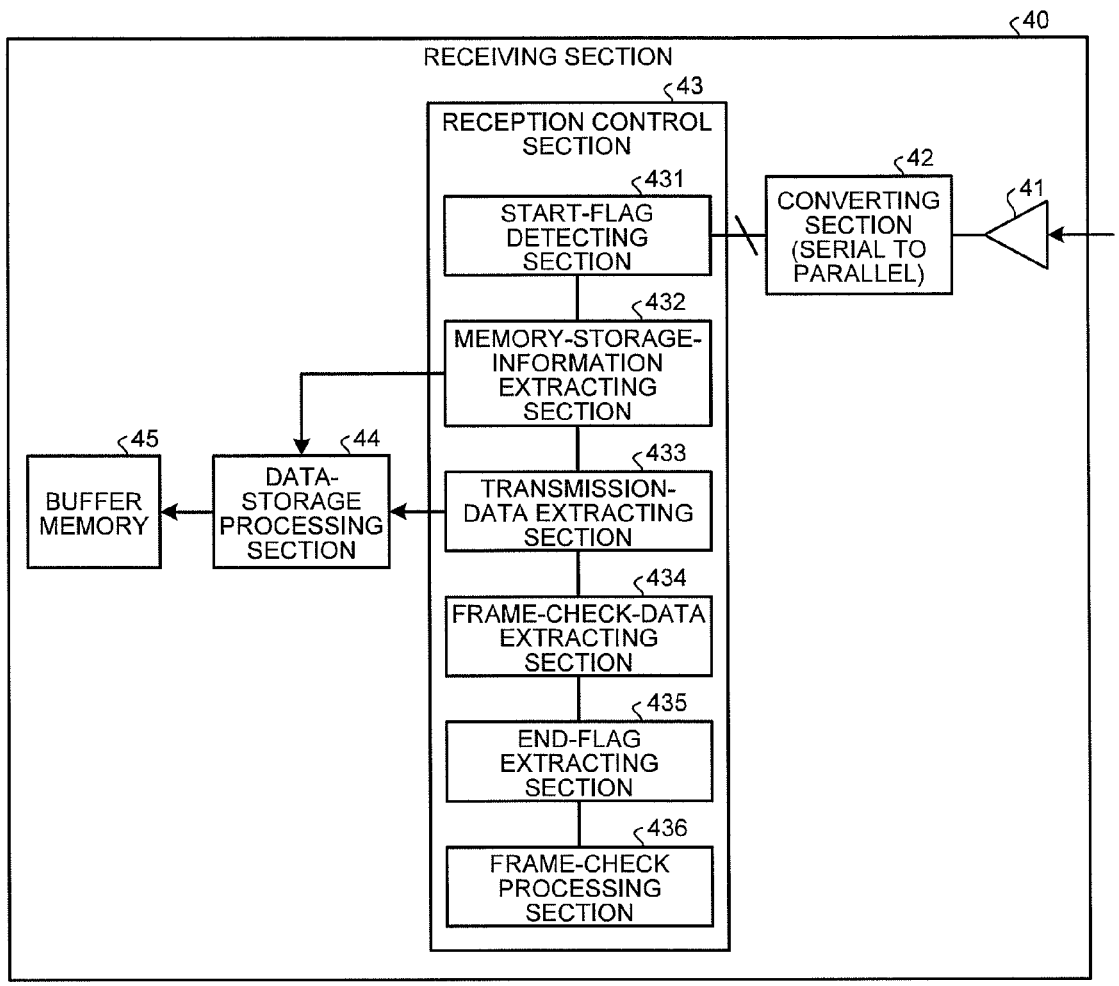
FIG. 7 is a schematic block diagram of a functional configuration of a receiving section provided in the unit according to the first embodiment.

FIG. 7 is a schematic block diagram of a functional configuration of the receiving section provided in the unit according to the first embodiment. A receiving section 40 includes a reception buffer 41, a converting section 42, a reception control section 43, a data-storage processing section 44, and a buffer memory 45.

The reception buffer 41 receives a frame of serial data. The converting section 42 sequentially converts the received serial data into parallel data.

The reception control section 43 is a processing section configured to analyze the received frame 130. The reception control section 43 includes a start-flag detecting section 431, a memory-storage-information extracting section 432, a transmission-data extracting section 433, a frame-check-data extracting section 434, an end-flag extracting section 435, and a frame-check processing section 436. The reception control section 43 sequentially detects the start flag 132, which is the start of the frame 130 converted into parallel data by the converting section 42. From a point when the start flag 132 is detected, the reception control section 43 extracts from the frame 130 the start flag 132, the memory storage information 133, the data 135, the frame check data 136, and the end flag 138, which are the information of the frame 130 specified by the communication protocol.

The start-flag detecting section 431 sequentially compares the parallel data output from the converting section 42 with a start flag pattern and performs match detection. At a point when the parallel data matches the start flag pattern, the start-flag detecting section 431 outputs a start flag detection signal and starts the memory-storage-information extracting section 432.

The memory-storage-information extracting section 432 makes use of the fact that the start flag 132 and the memory storage information 133 are usually specified as data having fixed length, and extracts data having specified length as the memory storage information 133 from the point when the start flag is detected. When the extraction of the memory storage information 133 is completed, the memory-storageinformation extracting section 432 outputs a completion signal indicating the extraction completion of the memory storage information 133 to the transmission-data extracting section 433.

The transmission-data extracting section 433 receives the completion signal output by the memory-storage-information extracting section 432 and starts extraction of the data 135. In the extraction of the data 135, although the start of the data 135 follows the memory storage information 133, because the length of the data 135 is different depending on the frame 130, it is difficult to extract the data 135. Incidentally, the frame check data 136 and the end flag 138 arranged following the data 135 are specified as data having a predetermined length by the communication protocol. Therefore, the transmission-data extracting section 433, making use of this fact, identifies the end of the data 135, by going back from a point of identification of the end flag 138 by the length of the end flag 138 and the frame check data 136. That is, the data 135 in the frame 130 is extracted by identifying the start and the end of the data 135. When the extraction of the data 135 is completed, the transmission-data extracting section 433 outputs a completion signal indicating the data extraction to the frame-check-data extracting section 434.

The frame-check-data extracting section 434 receives the completion signal from the transmission-data extracting section 433 and extracts the frame check data 136 in the frame 130. Because the frame check data 136 is arranged following the data 135, as in the identification of the end of the data 135, the frame-check-data extracting section 434 extracts the frame check data 136 by going back from a point of identification of the end flag 138 by the length of the end flag 138.

When the parallel data output from the converting section 42 matches an end flag pattern, the end-flag extracting section 435 identifies the end of the frame 130 and starts the frame-check processing section 436.

The frame-check processing section 436 performs a calculation of frame check such as CRC or checksum of the received frame 130 and compares a result of the calculation with the frame check data 136 extracted from the frame 130 to discriminate whether the received frame 130 is normal.

The data-storage processing section 44 stores the extracted data 135 in the buffer memory 45 as received data, based on the memory storage information 133 extracted by the reception control section 43. The buffer memory 45 stores the received data. Data storage position in the buffer memory 45 is set by the unit at a transmission source. The data 135 is stored in an address designated by the memory storage information 133.

Figure 8:
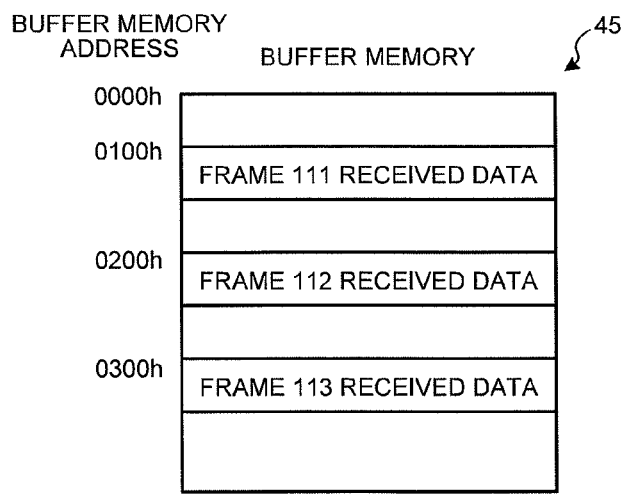
FIG. 8 is a schematic diagram of an example of a state of a buffer memory of the controller.

FIG. 8 is a schematic diagram of an example of a state of the buffer memory of the controller. In this example, data extracted from the frames 111 to 113 received from the motor driving devices 12-1 to 12-3 are stored in addresses "0100h", "0200h", and "0300h" of the buffer memory 45. Addresses for storing data in the frames 111 to 113 are determined from memory storage information extracted from the frames 111 to 113, respectively. That is, "0100h" is set in the memory storage information of the frame 111, which is transmitted by the motor driving device 12-1, as an address of the buffer memory 45 of the unit at a reception destination in which the data is stored. "0200h" and "0300h" are set in the memory storage information of the frames 112 and 113 respectively, which are transmitted by the motor driving devices 12-2 and 12-3, as addresses of the buffer memory 45 of the unit at the reception destinations.

The controller 13 manages addresses of the buffer memory 45 and the motor driving devices 12-1 to 12-3 that transmit data stored in the addresses, with the addresses of the buffer memory corresponding to the motor driving devices. The addresses of the buffer memory 45 at this point are fixed with respect to the motor driving devices 12-1 to 12-3. Therefore, every time data is updated, the controller 13 reads out data corresponding to the respective motor driving devices 12-1 to 12-3 from the addresses of the buffer memory 45 fixed for each of the motor driving devices 12-1 to 12-3. In this way, the controller 13 can acquire state data such as motor positions, motor speeds, driving currents, various control signals, and abnormal states of the motor driving devices 12-1 to 12-3.

Figure 9:
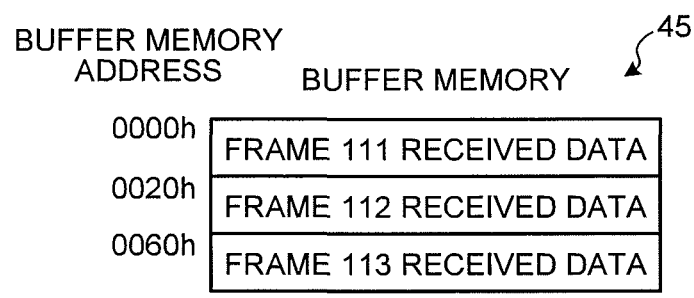
FIG. 9 is a schematic diagram of an example of a state of a buffer memory of a general receiving section.
Figure 10:
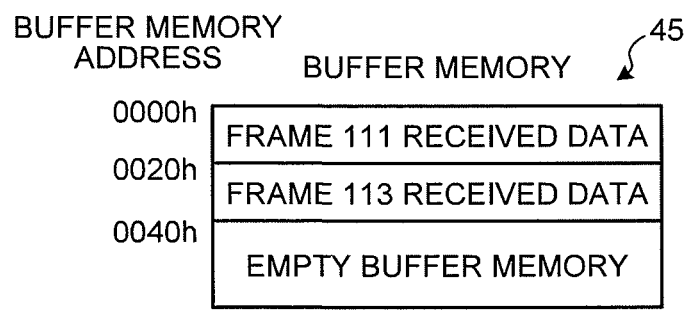
FIG. 10 is a schematic diagram of an example of a state of the buffer memory of the general receiving section.

FIGS. 9 and 10 are schematic diagrams of an example of a state of a buffer memory of a general receiving section. FIG. 9 is a schematic diagram of an example of a state of the buffer memory of the general receiving section that has normally received frames. FIG. 10 is a schematic diagram of an example of a state of the buffer memory of the general receiving section that has not normally received frames. The buffer states of the controller 13 of the motor driving control system shown in FIG. 1 are shown in the figures as well.

In a general motor driving control system, communication is performed using a frame not having the memory storage information 133, not the communication performed using the frame shown in FIG. 6. Therefore, as shown in FIG. 9, the receiving section of the general unit arranges received data in order of the reception, from the top (the start address) of the buffer memory 45. On the other hand, when serial data is broken in a communication path and at least one of frames that should be received is not received, as shown in FIG. 10, the arrangement of the data stored in the buffer memory 45 changes. In FIG. 10, a state of the buffer memory 45, in which the frame 112 that should have been received in the second reception is not received, is shown.

In a general case, when the controller 13 reads out data from the buffer memory 45, if the data is normally received as shown in FIG. 9, no problems occurs even if the data is directly read out from the buffer memory 45 in order. However, if a part of the frames has not been received as shown in FIG. 10, a problem occurs if the data is directly read out in order from the buffer memory 45. Therefore, in the general case, a received-data-abnormality analyzing section is provided with the controller 13, and after received data is read out from the buffer memory 45, a type of the frame is determined from the data. There is a problem that time is required for the determination of the type of the frame.

On the other hand, in the method according to the first embodiment, regions for storage are set in advance in the buffer memory 45 of the receiving section 40 of the controller 13 for each of the motor driving devices 12-1 to 12-3, and data is stored in the regions. Therefore, when frames cannot be received because of a communication abnormality, data is not stored in the regions. Consequently, the controller 13 can read data from the motor driving devices 12-1 to 12-3, and can determine presence or absence of reception of data from the motor driving devices 12-1 to 12-3, without analyzing a type of the frame of received data by the received-data-abnormality analyzing section.

Figure 11:
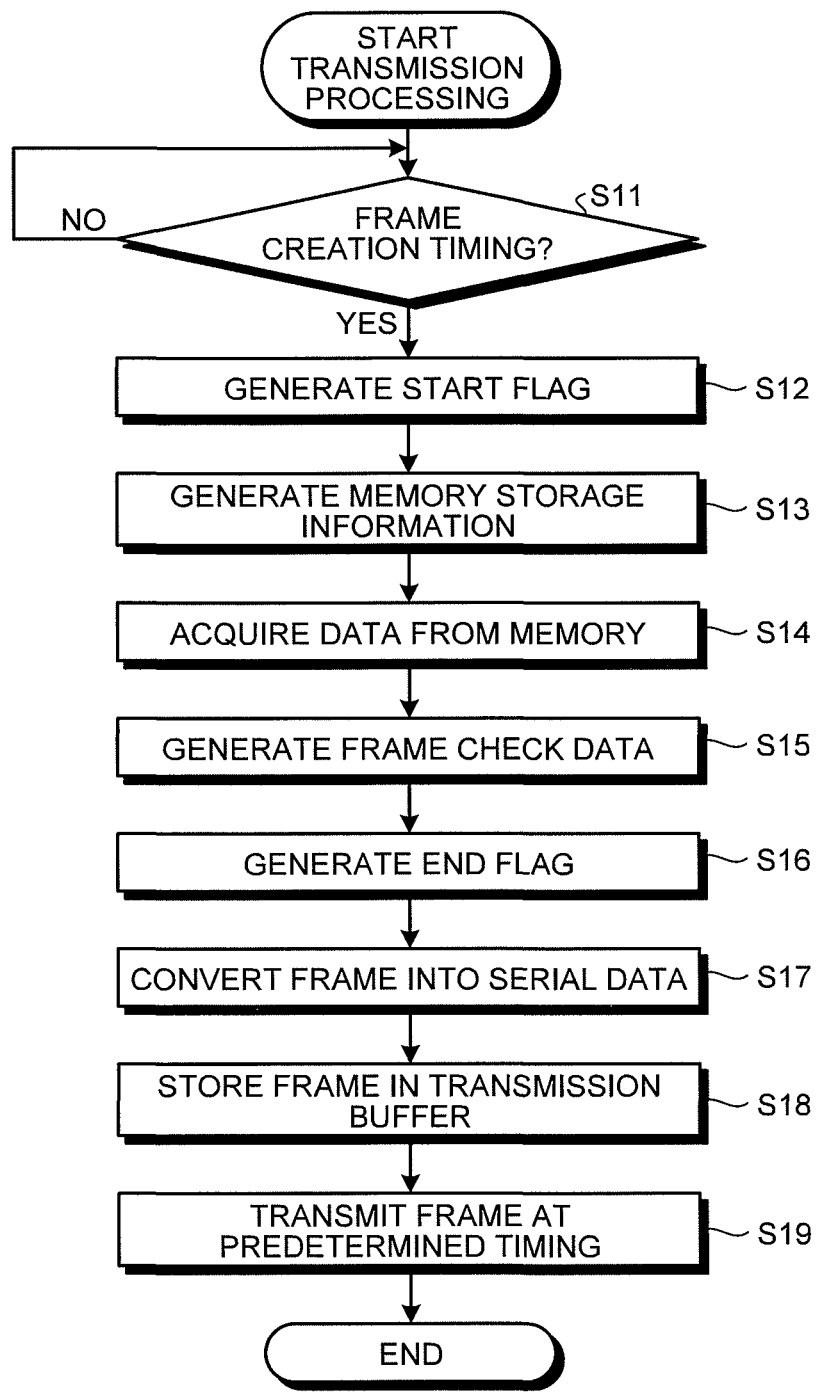
FIG. 11 is a flowchart for explaining an example of a procedure of transmission processing for a frame according to the first embodiment.

Transmission processing and reception processing for a frame in the units are explained. FIG. 11 is a flowchart for explaining an example of a procedure of transmission processing for a frame according to the first embodiment. First, the start-flag generating section 311 determines whether frame creation timing is good (step S11). The frame creation timing is determined according to presence or absence of reception of a startup signal from the transmission-startup-signal generating section 32. When the frame creation timing is not good (No at step S11), start-flag generating section 311 is on standby until the frame creation timing becomes good.

On the other hand, when the startup signal from the transmission-startup-signal generating section 32 is received and the frame creation timing is good (Yes at step S11), the start-flag generating section 311 generates the start flag 132 (step S12). The start-flag generating section 311 generates, as the start flag 132, a specific bit pattern specified by a communication protocol in use.

Subsequently, concerning data to be transmitted, the memory-storage-information generating section 312 generates the memory storage information 133 indicating a storage position (an address) in the buffer memory 45 of the receiving section 40 of the unit at a reception destination (step S13). For example, during the designing of the system, association information of a frame and an address in a reception destination buffer is set for the units. The memory storage information 133 is generated based on the association information of a frame and an address in a reception destination buffer. The generated memory storage information 133 is added to the start flag 132.

Thereafter, the transmission-data acquiring section 313 acquires, from the memory 33, the data 135 that should be transmitted (step S14) and adds the data 135 behind the memory storage information 133. Subsequently, the frame-check-data generating section 314 generates the frame check data 136 concerning frame data (step S15). The frame-check-data generating section 314 calculates CRC information, checksum information, or the like concerning the start flag 132, the memory storage information 133, and the data 135, and adds the CRC information, the checksum information, or the like behind the data 135. Thereafter, the end-flag generating section 315 generates, as the end flag 138, a specific bit pattern specified by the communication protocol in use (step S16). The end flag 138 is added behind the frame check data 136. Consequently, the frame 130 of parallel data is generated.

Subsequently, the converting section 34 converts the frame 130 of the parallel data into the frame 130 of serial data (step S17). The frame 130 is stored in the transmission buffer 35 (step S18). The frame 130 is transmitted at predetermined timing (step S19). The transmission processing for the frame 130 ends.

Figure 12:
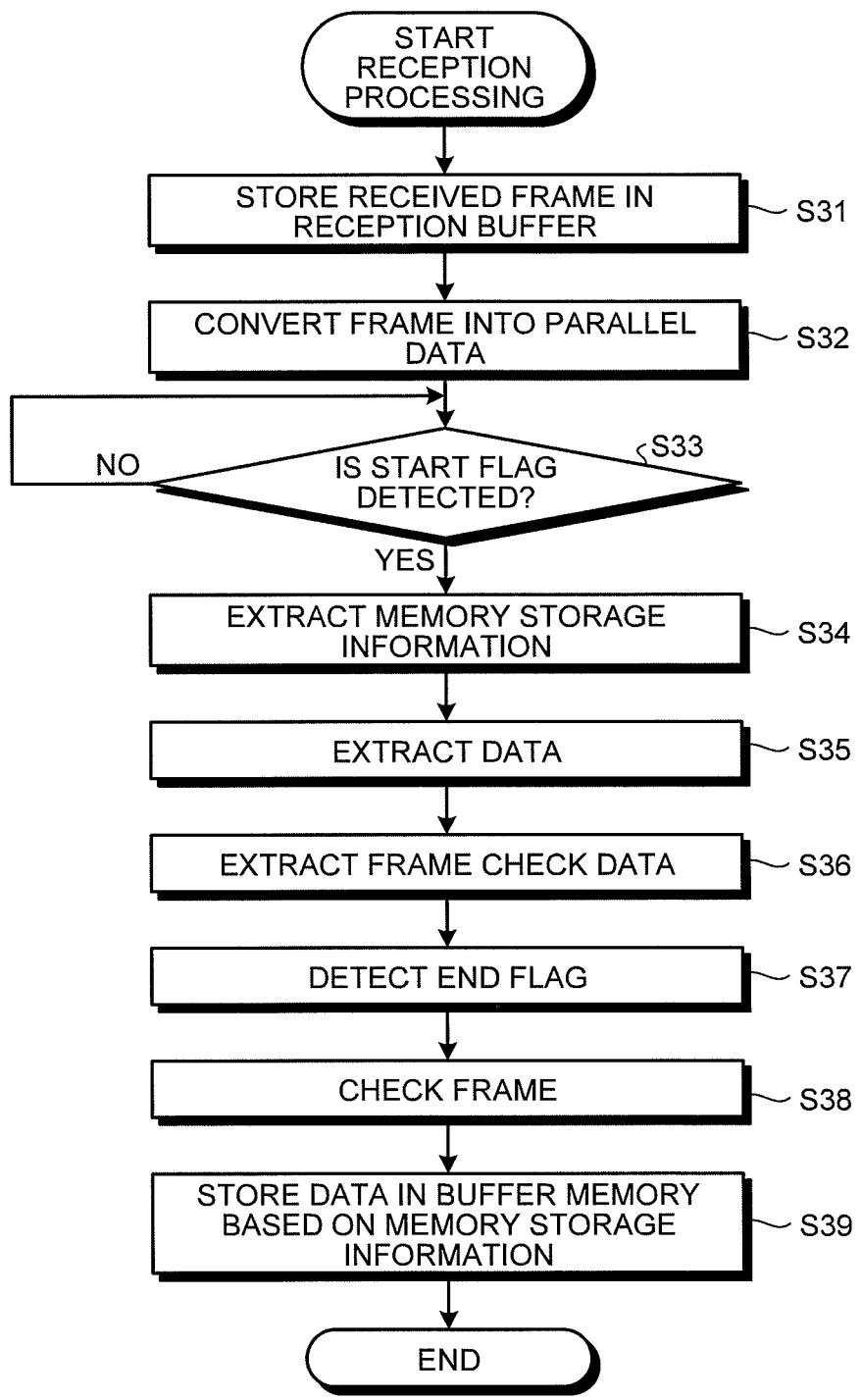
FIG. 12 is a flowchart for explaining an example of reception processing for a frame according to the first embodiment.

FIG. 12 is a flowchart for explaining an example of a procedure of reception processing for a frame according to the first embodiment. First, the receiving section 40 stores the received frame 130 of serial data in the reception buffer 41 (step S31). The converting section 42 converts the received frame 130 of the serial data into the frame 130 of parallel data (step S32).

Subsequently, the start-flag detecting section 431 sequentially compares data output from the converting section 42 with a sequential start flag pattern and detects the start flag 132 (step S33). When the start flag 132 is not detected (No at step S33), the start-flag detecting section 431 performs the detection until the start flag 132 is detected. On the other hand, when the start flag 132 is detected (Yes at step S33), the start-flag detecting section 431 outputs a start flag detection signal indicating that the start flag 132 is detected and starts the memory-storage-information extracting section 432.

The memory-storage-information extracting section 432 extracts the memory storage information 133 from a point of detection of the start flag 132 (step S34). Because the length of the start flag 132 and the memory storage information 133 is determined, data having predetermined length is acquired from the point of the detection of the start flag 132 and length equivalent to the start flag 132 is removed from the start, whereby the memory storage information 133 is acquired. After extracting the memory storage information 133, the memory-storage-information extracting section 432 outputs a completion signal indicating that the extraction of the memory storage information is completed.

Subsequently, upon receiving the completion signal, the transmission-data extracting section 433 extracts the data 135 (step S35). The transmission-data extracting section 433 starts the extraction after the memory storage information 133. The transmission-data extracting section 433 extracts the data 135, by going back from a point of identification of the end flag 138 of the frame by the length of the frame check data 136 and the end flag 138, and by excluding the frame check data 136 and the end flag 138 having the fixed length. When the extraction of the data is completed, the transmission-data extracting section 433 outputs a completion signal indicating the completion of the data extraction.

Thereafter, upon receiving the completion signal, the frame-check-data extracting section 434 extracts the frame check data 136 from the frame (step S36). The frame-check-data extracting section 434 starts the extraction from the end of the data 135 and excludes the end flag 138 having a fixed length, by going back to a point of identification of the end flag 138, whereby the frame check data 136 is extracted.

Subsequently, the end-flag extracting section 435 detects the end flag 138 (step S37). The detection of the end flag 138 is performed by determining whether data from the converting section 42 matches an end flag pattern. When the data matches the end flag pattern, the end of the frame is identified. When the end flag pattern is detected, the end-flag extracting section 435 starts the frame-check processing section 436.

The frame-check processing section 436 checks the received frame 130 (step S38). For example, the frame-check processing section 436 performs a calculation of frame check such as CRC or checksum of the received frame 130 and compares a result of the calculation with the frame check data 136 extracted from the frame 130 to discriminate whether the received frame 130 is normal.

Based on the memory storage information 133 extracted by the memory-storage-information extracting section 432, the data-storage processing section 44 stores the data extracted by the transmission-data extracting section 433 in the buffer memory 45 (step S39). In the memory storage information 133, a storage position (an address) of the data 135 in the buffer memory 45 is specified. Therefore, the data-storage processing section 44 stores the data 135 in the storage position. Consequently, the reception processing ends.

According to the first embodiment, the data 135 is stored in a specific address of the buffer memory 45 according to the memory storage information 133 in the frame 130. Therefore, it is possible to omit the reception-data-abnormality analyzing section necessary in the past. Further, it is possible to reduce processing time during reception. As a result, it is possible to simplify received data processing.

Processing time necessary for reception processing is reduced by simplifying the received data processing to make it possible to realize a shorter communication period. In serial communication for driving control, because the communication period can be further reduced, a data update period between apparatuses is reduced and data transmission time is reduced. Therefore, there is also an effect that it is possible to improve the performance of the entire control apparatus.

Further, even if certain one frame periodically received in retaining a plurality of packets of received data is not received, a frame normally received next is stored in a specific address of the buffer memory 45 according to the memory storage information 133. Therefore, it is possible to delete processing for searching for received data from the buffer memory 45 in the received-data processing section.

Second Embodiment

Figure 13:
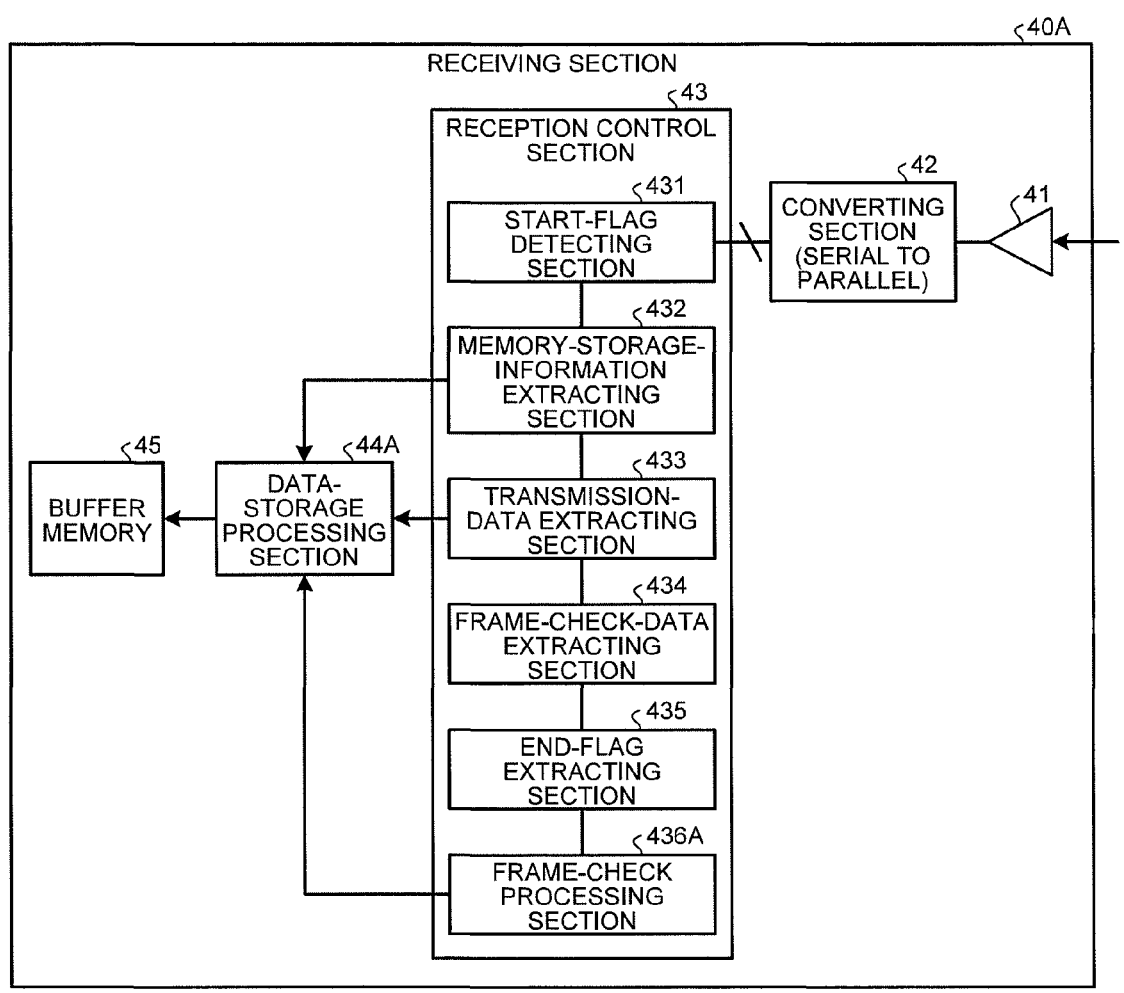
FIG. 13 is a schematic block diagram of the configuration of a receiving section according to a second embodiment.

FIG. 13 is a schematic block diagram of the configuration of a receiving section according to a second embodiment. In storing data extracted from a frame in the buffer memory 45, based on memory storage information extracted from the frame by the reception control section 43, a data-storage processing section 44A of a receiving section 40A according to the second embodiment has a function of acquiring a received data state and storing the received data state in the buffer memory 45 as received data together with data. The received data state indicates whether a frame from a frame-check processing section 436A of the reception control section 43 is normally received. Components same as the components in the first embodiment are denoted by the same reference numerals and signs and explanation of the components is omitted. Because the configuration of the transmitting section 30 is also the same as the configuration in the first embodiment, explanation of the configuration is omitted.

Figure 14:
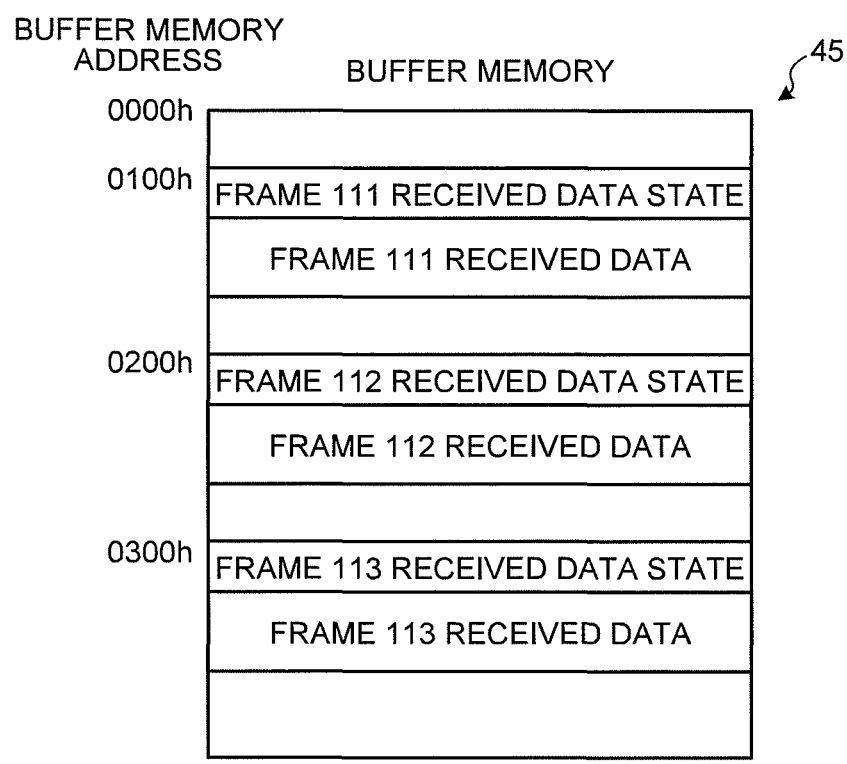
FIG. 14 is a schematic diagram of an example of a state of a buffer memory of a controller according to the second embodiment.

FIG. 14 is a schematic diagram of an example of a state of a buffer memory of a controller according to the second embodiment. In this embodiment, the addresses "0100h", "0200h", and "0300h" of the buffer memory 45 store received data states of the frames 111 to 113, together with data extracted from the frames 111 to 113 received from the motor driving devices 12-1 to 12-3. The data reception states are stored in addresses specified by memory storage information and the data is stored in regions following the addresses.

Every time data is updated, the controller 13 reads out received data state and data corresponding to the respective motor driving devices 12-1 to 12-3 from these fixed addresses in the buffer memory 45. The controller 13 determines, according to the received data state, whether the received frames 111 to 113 are normal. When the frames 111 to 113 are normally received, the controller 13 acquires, from the data, state data such as motor positions, motor speeds, driving currents, various control signals, and abnormal states of the motor driving devices 12-1 to 12-3. When the frames 111 to 113 are not normally received, the controller 13 does not acquire state data from the motor driving devices 12-1 to 12-3.

On the other hand, as shown in FIGS. 9 and 10, in the case of the receiving section having the general configuration, frames are stored in the buffer memory in order. Therefore, when one of the frames is not received as shown in FIG. 10, after reading out received data, it is necessary to determine a loss of the frame with the received-data-abnormality analyzing section and, taking into account the loss of the frame, to check a received data state separately retained in the receiving section.

According to the second embodiment, a received data state and data extracted from a frame are stored in a specific address of the buffer memory 45, based on memory storage information in the frame. Therefore, it is possible to acquire the received data state simultaneously with reading of the data and determine whether the data is abnormal. It is possible to obtain, in addition to the effects of the first embodiment, an effect that time required for obtaining the received data state can be reduced compared with the time required in the past.

The received data state is stored in the specific address of the buffer memory 45 together with the received data. Therefore, when one of periodically received frames is not received, it is possible to easily determine a loss of the frame. As a result, unlike processing in the past, it is unnecessary to perform, with the received-data processing section, processing for combining communication data information and the received data.

Third Embodiment

Figure 15:
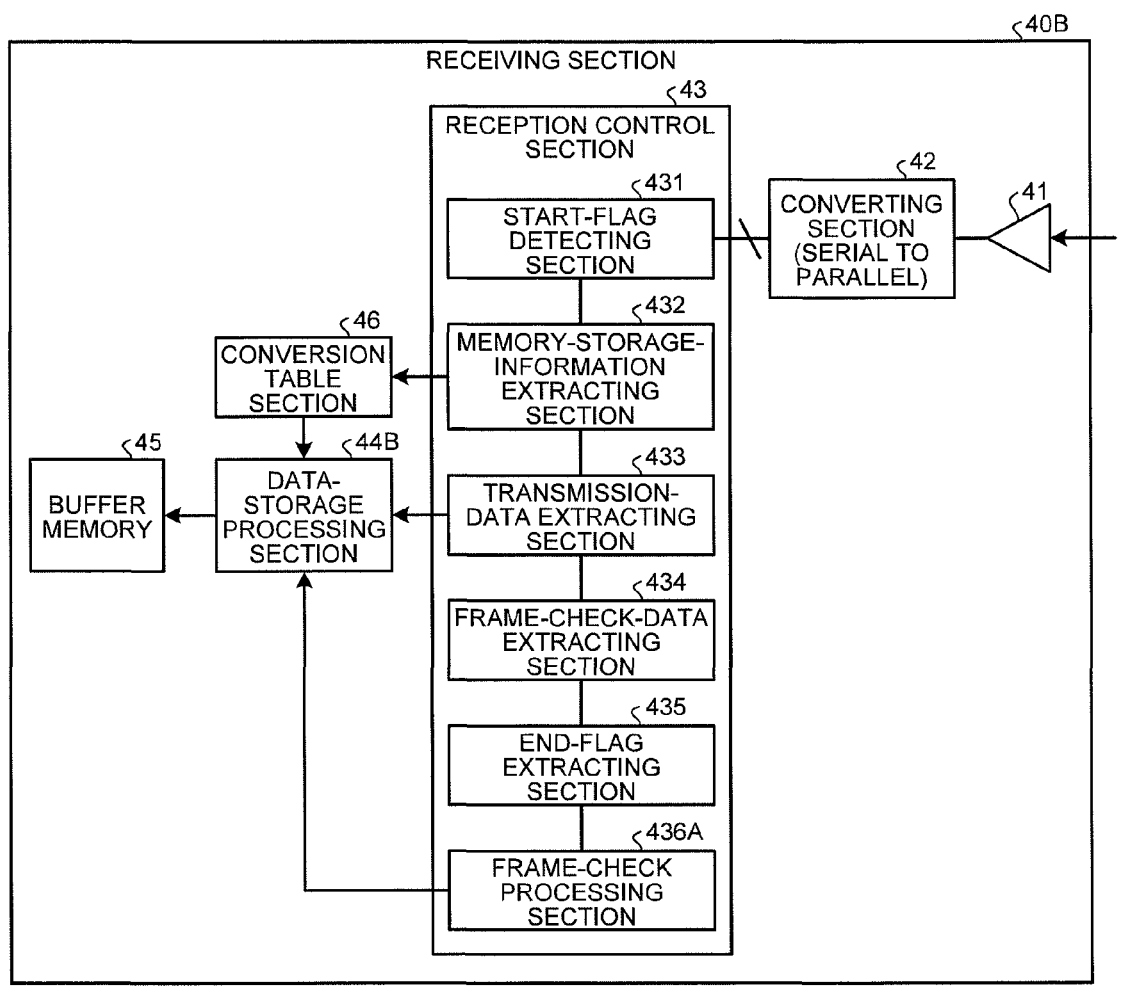
FIG. 15 is a schematic block diagram of the configuration of a receiving section according to a third embodiment.

FIG. 15 is a schematic block diagram of the configuration of a receiving section according to a third embodiment. A receiving section 40B according to the third embodiment further includes, in addition to the components in the second embodiment, a conversion table section 46 configured to convert memory storage information extracted from a frame into a storage destination address for storing data of the buffer memory 45. A data-storage processing section 44B stores data and a received data state extracted by the reception control section 43 in an address output by the conversion table section 46. Components same as the components in the first and second embodiments are denoted by the same reference numerals and signs and explanation of the components is omitted. Because the configuration of the transmitting section 30 is also the same as the configuration in the first embodiment, explanation of the configuration is omitted.

Figure 16:
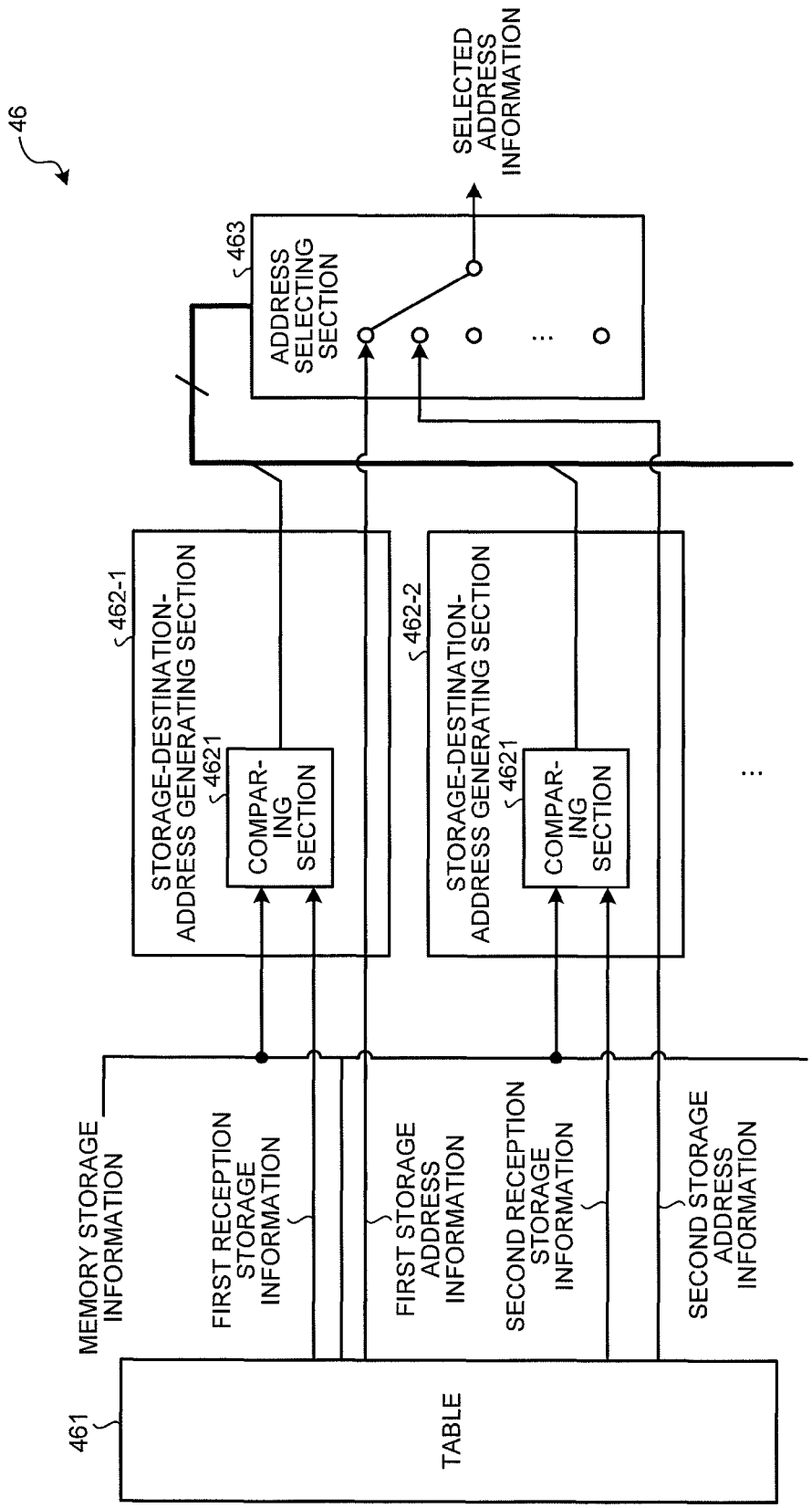
FIG. 16 is a schematic diagram of an example of the configuration of a conversion table section according to the third embodiment.

FIG. 16 is a schematic diagram of an example of the configuration of the conversion table section according to the third embodiment. The conversion table section 46 includes a table 461 showing a relation between memory storage information of frames and storage address information, which is storage destination addresses of the buffer memory 45, a plurality of storage-destination-address generating sections 462-1, 462-2, . . . configured to generate storage addresses, which are storage positions of received data in the buffer memory 45, and an address selecting section 463 configured to select a plurality of storage destination addresses.

The table 461 is memory arrangement conversion information that defines a relation between reception storage information and storage address information, where the reception storage information indicates memory storage information that the table 461 should receive, while the storage address information determines in which address of the buffer memory 45 data in a frame having the memory storage information is stored. The table 461 outputs pairs of the reception storage information and the storage address information by the number of the storage-destination-address generating sections 462-1, 462-2, . . .

FIG. 17 is a schematic diagram of an example of the configuration of the table. As explained above, the reception storage information of the table 461 is memory storage information that an apparatus (the receiving section 40) should receive. The storage address information is an actual address in the buffer memory 45 allocated to the reception storage information. For example, storage address information "A100h" is associated with reception storage information "0100h" and "0700h". Storage address information "A200h" is associated with reception storage information "0200h" and "0800h". Storage address information "A300h" is associated with reception storage information "0300h". In this way, a plurality of pieces of reception storage information is associated with the same one address of the buffer memory 45. However, when a plurality of pieces of reception storage information is associated with one address of the buffer memory 45, the addresses of the buffer memory 45 and the reception storage information are associated to prevent data communicated at one period of the controller 13 from being stored in the same address of the buffer memory 45, for example, to prevent a storage destination of data of the frame 111 and a storage destination of data of the frame 112 at the first communication period in FIGS. 3 and 4 from being stored in the same address of the buffer memory 45. The respective pieces of reception storage information in the table 461 are output to the different storage-destination-address generating sections 462-1, 462-2, . . .

The storage-destination-address generating sections 462-1, 462-2, . . . include comparing sections 4621 configured to compare the memory storage information of the frames and the received storage information referred to from the table 461. The respective storage-destination-address generating sections 462-1, 462-2, . . . compare, with the comparing sections 4621, the memory storage information extracted from the frames by the reception control section 43 with the reception storage information referred to from the table 461. When the memory storage information and the reception storage information match, the storage-destination-address generating sections 462-1, 462-2, . . . generate matching signals and output the storage address information referred to from the table 461 to the address selecting section 463, together with the matching signals, respectively. The storage-destination-address generating sections 462-1, 462-2, . . . are provided, for example, by the number of entries of the table 461.

The address selecting section 463 selects the storage address information from the storage-destination-address generating sections 462-1, 462-2, . . . that output the matching signals among a plurality of the storage-destination-address generating sections 462-1, 462-2, . . . and outputs the storage address information to the data-storage processing section 44 as storage destination addresses in the buffer memory 45.

FIG. 18 is a schematic diagram of an example of a state of a buffer memory of a controller according to the third embodiment. In this example, the addresses "A100h" "A200h", and "A300h" of the buffer memory 45 store the received data states of the frames 111 to 113, together with the data extracted from the frames 111 to 113 received from the motor driving devices 12-1 and 12-3. The data reception states are stored in the addresses converted by the conversion table section 46, and the data are stored in regions following the addresses.

Storage destination address generation processing in the conversion table section 46 is explained with reference to FIG. 16. The memory storage information is input to the conversion table section 46 from the memory-storage-information extracting section 432. The memory storage information is input to the comparing sections 4621 in all the storage-destination-address generating sections 462-1, 462-2, . . . of the conversion table section 46. All the pieces of reception storage information in the table 461 are input to the comparing sections 4621 in the different storage-destination-address generating sections 462-1, 462-2, . . . For example, first reception storage information in the table 461 is input to the storage-destination-address generating section 462-1 and second reception storage information is input to the storage-destination-address generating section 462-2. In this way, one piece of reception storage information in the table 461 is input to one of storage-destination-address generating sections 462-1, 462-2, . . .

Thereafter, the comparing sections 4621 of the storage-destination-address generating sections 462-1, 462-2, . . . compare the input memory storage information and the input reception storage information and determine whether the memory storage information and the reception storage information match. When the memory storage information and the reception storage information match, the comparing sections 4621 output matching signals to the address selecting section 463 and output the storage address information referred to from the table 461. For example, when the memory storage information and the first reception storage information match in the storage-destination-address generating section 462-1 and the memory storage information and the reception storage information do not match in the other storage-destination-address generating sections 462-2 . . . , only the comparing section 4621 of the storage-destination-address generating section 462-1 outputs the matching signal. The storage-destination-address generating sections 462-1, 462-2, . . . output the storage address information from the table 461 to the address selecting section 463.

The address selecting section 463 selects the storage address information from the storage-destination-address generating sections 462-1, 462-2, . . . that output the matching signals and outputs the selected storage address information to the data-storage processing section 44 as storage destination addresses of the buffer memory 45. For example, in the example explained above, the storage-destination-address generating section 462-1 outputs the matching signal. Therefore, the address selecting section 463 selects, as a storage destination address, the storage address information output from the storage-destination-address generating section 462-1. Consequently, the storage destination address generation processing ends.

In the system in the first and second embodiments, when frames including a plurality of pieces of memory storage information are received, the buffer memory 45 having a size encompassing the range of all the pieces of memory storage information 133 has to be prepared. However, according to the third embodiment, the storage destinations of the buffer memory 45 are converted for each of the frames by the conversion table section 46 to make it possible to store one or more (a plurality of) data exchanged at different communication periods in one address of the buffer memory 45. Therefore, it is possible to receive all the frames with a smaller size of the buffer memory 45.

Fourth Embodiment

In a fourth embodiment, other embodiments for reducing a buffer memory size of a receiving section are explained. Transmitting sections in units have a configuration identical to the configuration shown in FIG. 5 in the first embodiment. Receiving sections of the units have a configuration identical to the configuration shown in FIG. 15 in the third embodiment. Therefore, explanation of the configurations is omitted. However, in the fourth embodiment, the configuration of the conversion table section 46 of the receiving section 40 is different from the configuration in the third embodiment.

Figure 19:
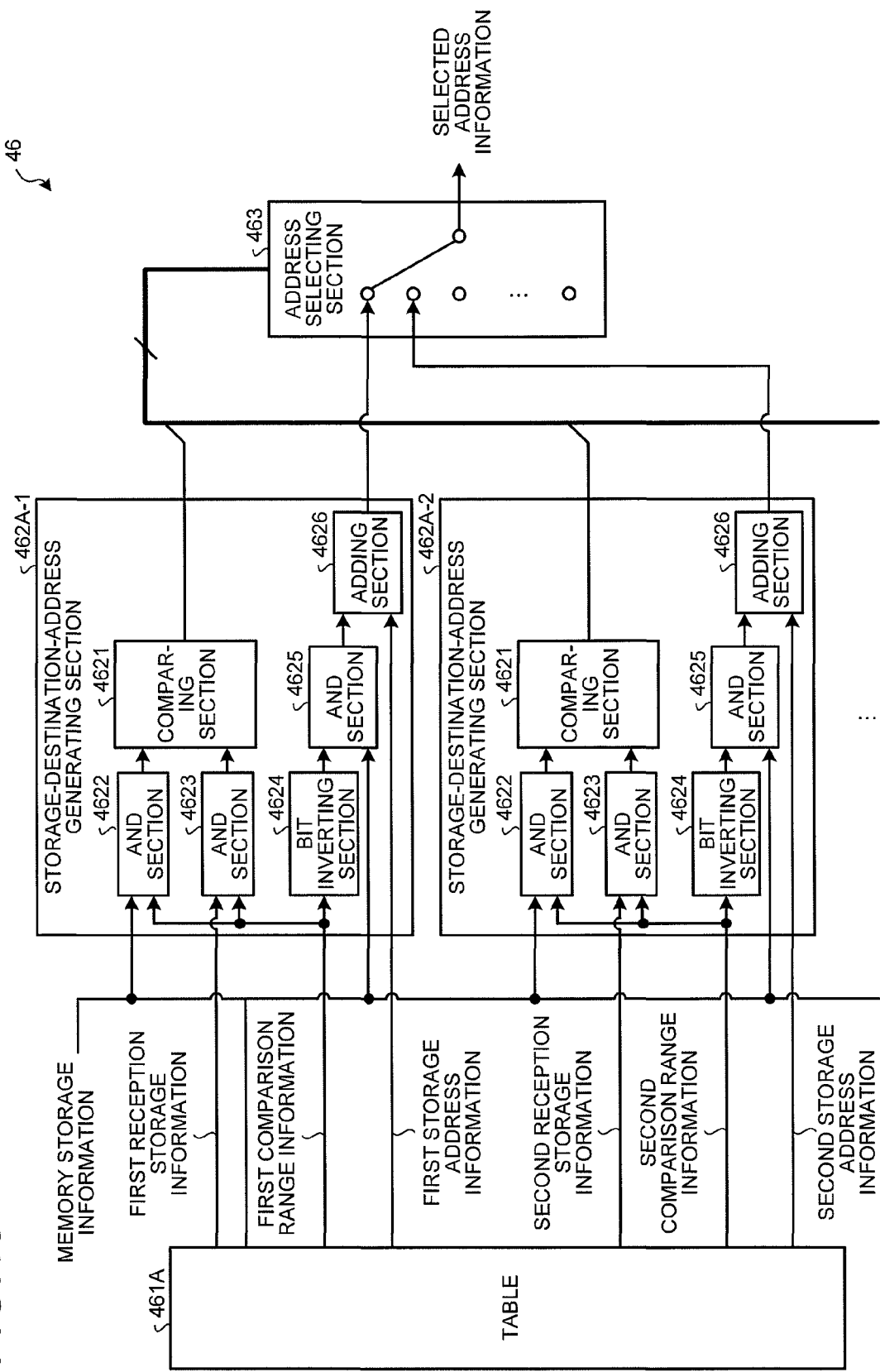
FIG. 19 is a schematic diagram of an example of the configuration of a conversion table section according to a fourth embodiment.

FIG. 19 is a schematic diagram of an example of the configuration of the conversion table section according to the fourth embodiment. The conversion table section 46 includes a table 461A indicating a relation between memory storage information of frames and storage destination addresses of the buffer memory 45, a plurality of storage-destination-address generating sections 462A-1, 462A-2, . . . configured to generate storage addresses, which are storage positions of received data in the buffer memory 45, and an address selecting section 463 configured to select a plurality of storage destination addresses.

The table 461A is a table for defining a relation among reception storage information indicating memory storage information that the table 461A should receive, comparison range information for determining a range in which the memory storage information and the reception storage information are compared, and address calculation information used for calculation of addresses in the buffer memory 45 of data in frames having the memory storage information. The table 461A outputs sets of the reception storage information, the comparison range information, and the address calculation information by the number of the storage-destination-address generating sections 462A-1, 462A-2, . . .

FIG. 20 is a schematic diagram of an example of the configuration of the table. The reception storage information of the table 461A is memory storage information of frames that an apparatus (the receiving section 40) should receive. The reception storage information is compared with memory storage information of received frames. The comparison range information has a function of a mask for defining a range in which the memory storage information (addresses) of the received frames and the reception storage information (addresses) are compared. The address calculation information is actual addresses in the buffer memory 45 allocated to the reception storage information. In this example, comparison range information "FF00h" and address calculation information "A100h" are registered in association with reception storage information "0100h".

The storage-destination-address generating sections 462A-1, 462A-2, . . . include AND sections 4622 configured to determine a comparison range of the memory storage information; AND sections 4623 configured to determine a comparison range of the reception storage information; comparing sections 4621 configured to compare the memory storage information whose the comparison range is determined with the reception storage information, referred to from the table 461A, whose comparison range is determined; bit inverting sections 4624 configured to invert the comparison range information; AND sections 4625 configured to determine, from the memory storage information, values to add to the address calculation information; and adding sections 4626 configured to add up the values determined by the AND sections 4625 and the address calculation information referred to from the table 461A and generate storage destination addresses of data in the frames.

Specifically, the AND sections 4622 and 4623 and the comparing sections 4621 compare the memory storage information with the reception storage information, whose comparison ranges are determined in the comparison range information, and determine whether the memory storage information and the reception storage information match. When the memory storage information and the reception storage information match, the comparing sections 4621 outputs a matching signal. The bit inverting sections 4624, the AND sections 4625, and the adding sections 4626 add up the memory storage information of portions not set as the comparison range in the comparison range information, that is, portions masked in the comparison range information, and the address calculation information to generate storage addresses of the data in the buffer memory 45.

The address selecting section 463 selects the storage addresses generated by the storage-destination-address generating sections 462A-1, 462A-2, . . . that output the matching signals among a plurality of storage-destination-address generating sections 462A-1, 462A-2, . . . , and outputs the storage addresses to the data-storage processing section 44 as storage addresses in the buffer memory 45.

Storage address generation processing in the conversion table section 46 is explained with reference to FIG. 19. The memory storage information is input to the conversion table section 46 from the memory-storage-information extracting section 432. The memory storage information is input to the AND sections 4622 and 4623 in all the storage-destination-address generating sections 462A-1, 462A-2, . . . of the conversion table section 46. Different sets of information among the sets of the reception storage information, the comparison range information, and the address calculation information in the table 461A are output to the different storage-destination-address generating sections 462A-1, 462A-2, . . . In the respective storage-destination-address generating sections 462A-1, 462A-2, . . . , the reception storage information is input to the AND sections 4623, the comparison range information is input to the AND sections 4622 and 4623 and the bit inverting sections 4624, and the address calculation information is input to the adding sections 4626.

The AND sections 4622 of the storage-destination-address generating sections 462A-1, 462A-2, . . . set, as first memory storage information, an AND of the memory storage information extracted from the frame by the reception control section 43 and the comparison range information referred to from the table 461A. The AND sections 4623 set, as comparison reception storage information, an AND of the reception storage information referred to from the table 461A and the comparison range information referred to from the table 461A.

The comparing sections 4621 compare the first memory storage information with the comparison reception storage information output from each of the AND sections 4622 and the AND sections 4623. When the first memory storage information and the comparison reception storage information match, the comparing sections 4621 output matching signals. At this point, the AND sections 4625 AND reversed comparison range information obtained by bit-inverting the comparison range information with the bit inverting sections 4624 and the memory storage information 133 and set the ANDed information as second memory storage information. The adding sections 4626 add up the second memory storage information and the address calculation information of the set of information referred to from the table 461A and set the added-up information as storage addresses. The storage addresses are output to the address selecting sections 463 together with the matching signals.

The address selecting section 463 selects the storage addresses output from the storage-destination-address generating sections 462A-1, 462A-2, . . . that output the matching signals and outputs the storage addresses to the data-storage processing section 44 as storage destination addresses in the buffer memory 45. The storage destination address generation processing ends.

The storage destination address generation processing performed using a table shown in FIG. 20 is explained. The memory storage information extracted from the frame is ANDed with the comparison range information "FF00h", which is referred to from the table 461A, by the AND sections 4622 of the storage-destination-address generating sections 462A-1, 462A-2, . . . Therefore, low-order 1 byte of the memory storage information 133 input to the comparing sections 4621 is always "00h". The reception storage information "0100h" referred to from the table 461A is also ANDed with the comparison range information "FF00h" by the AND sections 4623 of the storage-destination-address generating sections 462A-1, 462A-2, . . . Therefore, low-order 1 byte of the reception storage information input to the comparing sections 4621 is always "00h". In this way, according to the table shown in FIG. 20, all frames having the memory storage information in a range of "0100h" to "01FFh" are received.

When the comparison range information "FF00h" referred to from the table 461A is inverted by the bit inverting sections 4624 of the storage-destination-address generating sections 462A-1, 462A-2, . . . , inverted comparison range information "00FFh" is obtained. When the inverted comparison range information is ANDed with the received memory storage information by the AND sections 4625 of the storage-destination-address generating sections 462A-1, 462A-2, . . . , low-order 1 byte of the received memory storage information is output. When the low-order 1 byte and the address calculation information "A100h" acquired from the table 461A are added up by the adding sections 4626, addresses in a range of "A100h" to "A1FFh" obtained by adding up high-order 1 byte of the address calculation information and the received low-order 1 byte of the memory storage information are generated as storage addresses.

In this way, in the fourth embodiment, for example, in one set of the reception storage information, the comparison range information, and the address calculation information in the table shown in FIG. 20, the memory storage information 133 in the range of "0100h" to "01FFh" can be converted into storage addresses in the range of "A100h" to "A1FFh". That is, it is possible to enable more address conversion while reducing the capacity of the table.

In an example in which frames including "0100h", "0120h", and "0160h" are received as the memory storage information 133, high-order 1 byte output by the AND sections 4622 is "01h" respectively, and high-order 1 byte output by the AND sections 4623 is "01h" respectively. As a result, the comparing sections 4621 output matching signals concerning all the frames.

On the other hand, low-order 1 byte output by the AND sections 4625 is "00h", "20h", and "60h" respectively. The adding sections 4626 add up the low-order 1 byte and the address calculation information "A100h" of the table 461A and obtain "A100h", "A120h", and "A160h" as storage addresses, respectively. The address selecting section 463 stores respective received data state and data in the frames in these addresses.

FIG. 21 is a schematic diagram of an example of a state of the buffer memory of the controller according to the fourth embodiment. This example shows a state of the buffer memory 45 of the controller 13 that has received respective frames having "0100h", "0120h", and "0160h" as memory storage information. As explained above, data of the frame having the memory storage information "0100h" is stored in an address "A0100h" of the buffer memory 45, together with a received data state of the frame.

Similarly, data of the frames having the memory storage information "0120h" and "0160h" is stored in addresses "A0120h" and "A0160h" of the buffer memory 45, together with received data states of the frames, respectively.

As in the case of the first embodiment, in the table for determining a storage destination in the buffer memory 45 from the memory storage information 133, when a plurality of communication frames is received, it is necessary to increase table data by the number of communication frames that should be received. However, according to the fourth embodiment, a part of the memory storage information 133 is used as additional information of a storage address of the buffer memory 45. Therefore, when a plurality of frames is stored in the buffer memory 45, it is possible to minimize a data amount registered in the table 461A in the conversion table section 46. It is possible to receive a plurality of frames and generate storage destination addresses even if there is only one or a small number of storage-destination-address generating sections 462A-1, 462A-2, . . . That is, it is possible to reduce a necessary information amount of the table 461A for determining storage destinations in the buffer memory 45. As a result, there is an effect that when the storage-destination-address generating sections 462A-1, 462A-2, . . . are realized by circuits, it is possible to reduce a circuit size, and when the storage-destination-address generating sections 462A-1, 462A-2, . . . are realized by software, it is possible to realize the storage-destination-address generating sections 462A-1, 462A-2, . . . with a small number of programs.

In the embodiments explained above, the controller 13 and the motor driving devices 12-1 to 12-3 are daisy-chain connected. However, when star connection or ring connection is used as network topology, it is possible to transmit and receive data between the apparatuses in the same manner as explained above and obtain an effect identical to the effect in the embodiments.

Industrial Applicability

As explained above, the control apparatus according to the present invention is useful when a plurality of motor driving devices for servomotors, induction motors, or the like is connected to a network and a plurality of motors is synchronously operated according to a command from a controller connected to the network.

REFERENCE SIGNS LIST 11-1 to 11-3 Motors
12-1 to 12-3 Motor driving devices
13 Controller
21 Serial communication line
22 Power line
23 Detector cable
30 Transmitting section
31 Transmission control section
32 Transmission-startup-signal generating section
33 Memory
34 Converting section
35 Transmission buffer
40, 40A, 40B Receiving sections
41 Reception buffer
42 Converting section
43 Reception control section
44, 44A, 44B Data-storage processing sections
45 Buffer memory
46 Conversion table section
101 to 103, 111 to 113, 130 Frames
131 Frame header section
132 Start flag
133 Memory storage information
134 Frame data section
135 Data
136 Frame check data
137 Frame footer section
138 End flag
311 Start-flag generating section
312 Memory-storage-information generating section
313 Transmission-data acquiring section
314 Frame-check-data generating section
315 End-flag generating section
431 Start-flag detecting section
432 Memory-storage-information extracting section
433 Transmission-data extracting section
434 Frame-check-data extracting section
435 End-flag extracting section
436 Frame-check processing section
461, 461A Tables
462-1, 462-2, 462A-1, 462A-2 Storage-destination-address generating sections
462 Address selecting section
4621 Comparing section
4622, 4623, 4625 AND sections
4624 Bit inverting section
4626 Adding section

The invention claimed is:

1. An overall control apparatus used in a control system in which at least one control apparatus, each including a control section, a transmitting section, and a receiving section, and the overall control apparatus including a first control section, a first transmitting section, and a first receiving section and configured to control the at least one control apparatus are connected via a network and one of the at least one control apparatus and the overall control apparatus generates a reference timing, the control system performing data communication by serial communication between the overall control apparatus and the at least one control apparatus under a predetermined communication period, wherein the first receiving section includes:
a reception control section configured to extract memory storage information, data, and frame check data, from a frame containing the data acquired from a memory of other control apparatuses from among the at least one control apparatus, the memory storage information indicating a storage position of the data in a buffer memory of the first receiving section of the overall control apparatus, and the frame check data used for error detection of the data, and perform error detection by using the frame check data concerning the extracted data;
the buffer memory configured to store the extracted data; and
a data-storage processing section configured to store a received data state, which is a result of the error detection performed by the reception control section, together with the extracted data, at an address of the buffer memory designated by the memory storage information, and the first control section is configured to read out control data received from the other control apparatuses and a data state corresponding to the received control data from a specified address of the buffer memory fixedly set for each of the other control apparatuses, acquire desired data from the read out control data when the corresponding data state is normal, and does not acquire desired data from the read out control data when the corresponding data state is not normal.

2. The overall control apparatus according to claim 1, wherein the first receiving section further includes:
a conversion table section configured to acquire storage address information corresponding to the memory storage information extracted by the reception control section, based on memory arrangement conversion information defining a relation between reception storage information, which is memory storage information the overall control apparatus should receive, and the storage address information indicating a storage position in the buffer memory of the data in the frame having the reception storage information in the memory storage information,
wherein the data-storage processing section is configured to store the extracted data at the address of the buffer memory designated by the storage address information acquired from the conversion table section, and
wherein the memory arrangement conversion information has a plurality of pieces of the reception storage information associated with one piece of the storage address information.

3. The overall control apparatus according to claim 1, wherein the first receiving section further includes:
a conversion table section including:
a memory-arrangement-conversion-information storing section configured to store memory arrangement conversion information which associates reception storage information that is memory storage information the overall control apparatus should receive, a first mask for acquiring predetermined information from the memory storage information included in the frame, and address calculation information used for calculation of a storage position in the buffer memory of data in the frame having the reception storage information in the memory storage information included in the frame; and
a storage-destination-address generating section configured to output, to the data-storage processing section, information obtained by adding the address calculation information to a value obtained by applying a second mask to the memory storage information included in the received frame, the second mask formed by bit-inverting the first mask, wherein the obtained information output to the data-storage processing section is storage address information set as a storage destination of the data in the frame having the memory storage information, and the storage-destination-address generating section is configured to output the storage address information based on a determination that a value obtained by applying the first mask to the reception storage information matches a value obtained by applying the first mask to the memory storage information, and
the data-storage processing section is configured to store the extracted data at the address of the buffer memory designated by the storage address information output from the storage-destination-address generating section.

4. A control system in which at least one control apparatus including a control section, a transmitting section, and a receiving section and configured to drive a motor and an overall control apparatus including a first control section, a first transmitting section, and a first receiving section and configured to control the at least one control apparatus are connected via a network, and one of the at least one control apparatus and the overall control apparatus generates a reference timing, the control system performing data communication by serial communication between the overall control apparatus and the at least one control apparatus under a predetermined communication period, wherein the transmitting section of the at least one control apparatus includes:
a memory configured to store data transmitted to the overall control apparatus; and
a transmission control section configured to generate a frame containing the data acquired from the memory, memory storage information indicating a storage position of the data in a buffer memory of the first receiving section of the overall control apparatus, and frame check data used for error detection of the data, and the first receiving section of the overall control apparatus includes:
a reception control section configured to extract the memory storage information, the data, and the frame check data from the frame transmitted by the at least one control apparatus, and perform error detection using the frame check data concerning the extracted data;
the buffer memory configured to store the extracted data; and
a data-storage processing section configured to store a received data state, which is a result of the error detection performed by the reception control section, together with the extracted data, at an address of the buffer memory designated by the memory storage information, the first control section of the overall control apparatus is configured to read out control data from other control apparatuses from among the at least one control apparatus and a data state corresponding to the control data, from a specified address of the buffer memory fixedly set for each of the other control apparatuses, acquire desired data from the read out control data when the corresponding data state is normal, and not acquire desired data from the read out control data when the corresponding data state is not normal, and wherein the memory storage information is configured to have a different value set for each of the control apparatuses connected to the network.

5. The control system according to claim 4, wherein the first receiving section of the overall control apparatus further includes a conversion table section configured to acquire storage address information corresponding to the memory storage information extracted by the reception control section, based on memory arrangement conversion information defining a relation between reception storage information, which is memory storage information the overall control apparatus should receive, and the storage address information indicating a storage position in the buffer memory of the data in the frame having the reception storage information in the memory storage information, the data-storage processing section of the overall control apparatus is configured to store the extracted data at the address of the buffer memory designated by the storage address information acquired from the conversion table section, and wherein the memory arrangement conversion information has a plurality of pieces of the reception storage information associated with one piece of the storage address information.

6. The control system according to claim 4, wherein the first receiving section of the overall control apparatus further includes a conversion table section including:

a memory-arrangement-conversion-information storing section configured to store memory arrangement conversion information which associates reception storage information that is memory storage information the overall control apparatus should receive, a first mask for acquiring predetermined information from the memory storage information included in the frame, and address calculation information used for calculation of a storage position in the buffer memory of data in the frame having the reception storage information in the memory storage information included in the frame; and a storage-destination-address generating section configured to output, to the data-storage processing section, information obtained by adding the address calculation information to a value obtained by applying a second mask to the memory storage information, included in the received frame, the second mask formed by bit-inverting the first mask, wherein the obtained information output to the data-storage processing section is storage address information set as a storage destination of the data in the frame having the memory storage information, and the storage-destination-address generating section is configured to output the storage address information based on a determination that a value obtained by applying the first mask to the reception storage information matches a value obtained by applying the first mask to the memory storage information, and the data-storage processing section of the overall control apparatus is configured to store the extracted data at the address of the buffer memory designated by the storage address information output from the storage-destination-address generating section.

7. A communication method in a control system in which at least one control apparatus including a control section, a transmitting section, and a receiving section and configured to drive a motor and an overall control apparatus including a first control section, a first transmitting section, and a first receiving section and configured to control the at least one control apparatus are connected via a network, and one of the at least one control apparatus and the overall control apparatus generates a reference timing, the control system performing data communication by serial communication between the overall control apparatus and the at least one control apparatus under a predetermined communication period, wherein the communication method comprising:

a frame generating step at which the at least one control apparatus generates a frame including data transmitted to the overall control apparatus, memory storage information indicating a storage position of the data in a buffer memory of the first receiving section of the overall control apparatus, and frame check data used for error detection of the data;

a frame transmitting step at which the at least one control apparatus transmits the frame to the overall control apparatus;

an extracting step at which the overall control apparatus extracts the memory storage information, the data, and the frame check data from the frame;

an error detecting step at which the overall control apparatus performs error detection by using the frame check data concerning the extracted data;

a data storing step at which the overall control apparatus stores a received data state, which is a result of the performed error detection, together with the extracted data, at an address of the buffer memory designated by the memory storage information;

a data readout step at which the overall control apparatus reads out control data and a data state corresponding to the control data from a specified address of the buffer memory fixedly set for each of other control apparatuses from among the at least one control apparatus; and a data acquiring step at which the overall control apparatus acquires desired data from the read out control data when the corresponding data state is normal and does not acquire desired data from the read out control data when the corresponding data state is not normal, wherein the memory storage information is configured to have a different value set for each of the other control apparatuses connected to the network.

8. The communication method according to claim 7, further comprising:

after the extracting step and before the data storing step, an address converting step at which the overall control apparatus acquires storage address information corresponding to the memory storage information extracted at the extracting step, based on memory arrangement conversion information defining a relation between reception storage information, which is memory storage information the overall control apparatus should receive, and the storage address information indicating a storage position in the buffer memory of the data in the frame having the reception storage information in the memory storage information, wherein, at the data storing step, the overall control apparatus stores the extracted data at the address of the buffer memory designated by the storage address information acquired at the address converting step, and wherein the memory arrangement conversion information has a plurality of pieces of the reception storage information associated with one piece of the storage address information.

9. The communication method according to claim 7, wherein the overall control apparatus includes memory arrangement conversion information which associates reception storage information, which is memory storage information that the overall control apparatus should receive, a first mask for acquiring predetermined information from the memory storage information included in the frame, and address calculation information used for calculation of a storage position in the buffer memory of data in the frame having the reception storage information in the memory storage information included in the frame, and after the extracting step and before the data storing step, the communication method further includes:

a determining step at which the overall control apparatus determines whether a value obtained by applying the first mask to the reception storage information matches a value obtained by applying the first mask to the memory storage information match; and an address converting step at which, based on a determination that the values match at the determining step, the overall control apparatus outputs information obtained by adding the address calculation information to a value obtained by applying a second mask to the memory storage information, the second mask formed by bit-inverting the first mask, as storage address information set as a storage destination of the data in the frame having the memory storage information, and at the data storing step, the overall control apparatus stores the extracted data at the address of the buffer memory designated by the storage address information output at the address converting step.

* * * * *